(12) United States Patent
Li et al.

(10) Patent No.: US 11,700,312 B2
(45) Date of Patent: Jul. 11, 2023

(54) METHOD AND SYSTEM FOR USER PLANE PATH SELECTION

(71) Applicant: HUAWEI TECHNOLOGIES CO., LTD., Shenzhen (CN)

(72) Inventors: Xu Li, Nepean (CA); Ngoc Dung Dao, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/182,529

(22) Filed: Feb. 23, 2021

(65) Prior Publication Data

US 2021/0176322 A1 Jun. 10, 2021

Related U.S. Application Data

(63) Continuation of application No. 15/712,820, filed on Sep. 22, 2017, now Pat. No. 10,972,552.

(Continued)

(51) Int. Cl.
*H04W 36/00* (2009.01)
*H04L 67/148* (2022.01)
(Continued)

(52) U.S. Cl.
CPC .......... *H04L 67/148* (2013.01); *H04L 47/19* (2013.01); *H04L 67/141* (2013.01); *H04W 4/021* (2013.01);
(Continued)

(58) Field of Classification Search
CPC ....... H04L 67/148; H04L 47/14; H04L 47/19; H04L 67/141; H04L 67/18; H04W 76/20;
(Continued)

(56) References Cited

U.S. PATENT DOCUMENTS 9,781,259 B1 * 10/2017 Kodaypak ............... H04L 67/61
2003/0101246 A1 * 5/2003 Lahti ................... H04L 67/1006
709/221

(Continued)

FOREIGN PATENT DOCUMENTS

CN 101273650 A 9/2008
CN 102158897 A 8/2011
(Continued)

OTHER PUBLICATIONS

"Architecture enhancements for service capability exposure"; 3GPP TR 23.708 V13.0.0 (Jun. 2015).
(Continued)

*Primary Examiner* — Chris Parry
*Assistant Examiner* — Hassan A Khan

(57) ABSTRACT

Aspects of the disclosure provide a system and method used for allowing a path selection or reselection (hereby (re) selection). In some embodiments data packets for a session between a UE and an application system (AS) can utilize a pre-established user plane path between the AS and an access node (AN) which serves the UE. This can allow for faster session set-up times as a new user plane (UP) path need not be established for every new session if existing UP paths can be utilized. Some embodiments allow an application aware (re)selection of the user plane.

17 Claims, 14 Drawing Sheets

Related U.S. Application Data

(60) Provisional application No. 62/402,412, filed on Sep. 30, 2016.

(51) Int. Cl.
*H04L 67/141* (2022.01)
*H04W 4/021* (2018.01)
*H04W 76/20* (2018.01)
*H04W 8/04* (2009.01)
*H04L 47/19* (2022.01)
*H04L 67/52* (2022.01)
*H04W 36/08* (2009.01)

(52) U.S. Cl.
CPC ............. *H04W 8/04* (2013.01); *H04W 76/20* (2018.02); *H04L 67/52* (2022.05); *H04W 36/0011* (2013.01); *H04W 36/08* (2013.01)

(58) Field of Classification Search
CPC .. H04W 4/021; H04W 36/0011; H04W 36/08
See application file for complete search history.

(56) References Cited

U.S. PATENT DOCUMENTS

| | | | |
|---|---|---|---|
| 2005/0063304 A1* | 3/2005 | Sillasto | H04W 76/38 370/229 |
| 2005/0135389 A1* | 6/2005 | Hurtta | H04W 28/18 370/401 |
| 2008/0153443 A1* | 6/2008 | Takusagawa | H04W 36/0011 455/187.1 |
| 2008/0161007 A1* | 7/2008 | Burgess | H04W 76/11 455/450 |
| 2008/0205345 A1* | 8/2008 | Sachs | H04W 36/0011 370/332 |
| 2010/0208704 A1* | 8/2010 | Wu | H04L 12/66 370/331 |
| 2010/0291943 A1* | 11/2010 | Mihaly | H04L 67/1008 455/450 |
| 2011/0201351 A1* | 8/2011 | Chen | H04W 4/02 455/456.1 |
| 2011/0202647 A1* | 8/2011 | Jin | H04L 69/40 709/223 |
| 2012/0281566 A1* | 11/2012 | Pelletier | H04W 76/27 370/252 |
| 2013/0039337 A1* | 2/2013 | Hwang | H04W 36/0066 370/331 |
| 2013/0073508 A1* | 3/2013 | Zhou | H04L 65/1094 706/47 |
| 2013/0100819 A1* | 4/2013 | Anchan | H04W 48/20 370/241 |
| 2013/0114446 A1* | 5/2013 | Liu | H04W 24/10 370/252 |
| 2013/0272247 A1* | 10/2013 | Guo | H04W 76/12 370/328 |
| 2013/0286821 A1* | 10/2013 | Liu | H04W 48/04 370/225 |
| 2013/0288668 A1* | 10/2013 | Pragada | H04M 15/00 455/426.1 |
| 2013/0322365 A1* | 12/2013 | Garcia Martin | H04W 72/51 370/329 |
| 2014/0179310 A1* | 6/2014 | Liang | H04W 28/0226 455/433 |
| 2014/0256283 A1* | 9/2014 | Lin | H04W 4/025 455/404.2 |
| 2014/0376454 A1* | 12/2014 | Boudreau | H04W 24/02 370/329 |
| 2015/0078295 A1* | 3/2015 | Mandyam | H04L 65/1101 370/329 |
| 2015/0134799 A1* | 5/2015 | Clark | H04L 45/24 709/223 |
| 2015/0264512 A1* | 9/2015 | Jain | H04W 4/70 370/328 |
| 2015/0280927 A1* | 10/2015 | Liang | H04L 12/1407 370/259 |
| 2015/0341837 A1* | 11/2015 | Zhao | H04W 36/165 455/436 |
| 2015/0351138 A1* | 12/2015 | Metsala | H04L 45/50 370/254 |
| 2016/0112896 A1* | 4/2016 | Karampatsis | H04W 28/0289 370/230.1 |
| 2016/0135010 A1* | 5/2016 | Zhu | H04W 4/12 370/328 |
| 2016/0156479 A1* | 6/2016 | Baek | H04M 15/863 455/406 |
| 2016/0174198 A1* | 6/2016 | Akiyoshi | H04W 72/04 370/329 |
| 2016/0270132 A1* | 9/2016 | Patil | H04W 76/12 |
| 2016/0277243 A1* | 9/2016 | Kim | H04L 41/0816 |
| 2016/0337915 A1* | 11/2016 | Tan | H04W 24/02 |
| 2017/0028988 A1* | 2/2017 | Light-Holets | B60W 10/30 |
| 2017/0036642 A1* | 2/2017 | Nomura | B62D 25/105 |
| 2017/0150420 A1* | 5/2017 | Olsson | H04L 41/5054 |
| 2017/0242730 A1* | 8/2017 | Wang | H04W 28/0247 |
| 2017/0244619 A1* | 8/2017 | Bhatia | H04W 36/12 |
| 2017/0289858 A1* | 10/2017 | Faccin | H04W 8/22 |
| 2017/0289882 A1* | 10/2017 | Faccin | H04W 8/22 |
| 2017/0317894 A1* | 11/2017 | Dao | H04L 41/5009 |
| 2017/0331691 A1* | 11/2017 | Zhou | H04L 69/329 |
| 2017/0339609 A1* | 11/2017 | Youn | H04W 76/11 |
| 2017/0366399 A1 | 12/2017 | Li et al. | |
| 2017/0366423 A1* | 12/2017 | Griot | H04L 67/568 |
| 2017/0367026 A1 | 12/2017 | Li et al. | |
| 2018/0077681 A1* | 3/2018 | Leroux | H04W 68/02 |
| 2018/0176979 A1* | 6/2018 | Ryu | H04W 76/30 |
| 2018/0227807 A1* | 8/2018 | Youn | H04W 36/0011 |
| 2018/0295556 A1* | 10/2018 | Baek | H04W 8/24 |
| 2018/0317121 A1* | 11/2018 | Liao | H04W 28/0289 |
| 2018/0324671 A1* | 11/2018 | Palnati | H04M 15/66 |
| 2018/0352593 A1* | 12/2018 | Velev | H04W 24/08 |
| 2018/0376373 A1* | 12/2018 | Liao | H04W 40/24 |
| 2019/0028866 A1* | 1/2019 | Baek | H04W 4/70 |
| 2019/0045408 A1* | 2/2019 | Kim | H04W 36/08 |
| 2019/0058767 A1* | 2/2019 | Chandramouli | H04L 12/14 |
| 2019/0069211 A1* | 2/2019 | Rönneke | H04W 4/70 |
| 2019/0182895 A1* | 6/2019 | Di Girolamo | H04L 67/148 |

FOREIGN PATENT DOCUMENTS

| | | |
|---|---|---|
| CN | 102763392 A | 10/2012 |
| CN | 102811473 A | 12/2012 |
| CN | 102868994 A | 1/2013 |
| CN | 103582044 A | 2/2014 |
| CN | 104348826 A | 2/2015 |
| CN | 104704905 A | 6/2015 |
| CN | 105393506 A | 3/2016 |
| CN | 106210042 A | 12/2016 |
| EP | 2884803 A1 | 12/2013 |
| EP | 3276990 A1 | 1/2018 |
| JP | 2005510802 A | 4/2005 |
| JP | 2013502162 A | 1/2013 |
| JP | 2015177385 A | 10/2015 |
| JP | 2016537920 A | 12/2016 |
| WO | 2014035418 A1 | 3/2014 |
| WO | 2014117370 A1 | 8/2014 |
| WO | 2015055063 A1 | 4/2015 |
| WO | 2015103875 A1 | 7/2015 |
| WO | 2016045708 A1 | 3/2016 |
| WO | 2016074138 A1 | 5/2016 |
| WO | 2016163723 A1 | 10/2016 |
| WO | 2018008980 A1 | 1/2018 |

OTHER PUBLICATIONS

Huawei et al.,"Solution for key issue 6: Co-ordination the Session and Service Continuity with the Application-aware UP Path (Re)selection",SA WG2 Meeting #116b S2-165150 (revision of S2-164628),Aug. 29-Sep. 2, 2016, Sanya, P.R. China,total 4 pages.
Huawei et al.,"TS 23.502: Procedures of enabling application-influenced UP management and SSC handling",3GPP TSG SA

(56) References Cited

OTHER PUBLICATIONS

WG2 Meeting #120 S2-172006, Mar. 27-Mar. 31, 2017, Busan, South Korea, Total 5 Pages.
International Search Report dated Sep. 4, 2017 for corresponding International Application No. PCT/CN2017/089301 filed Jun. 21, 2017.
3rd Generation Partnership Project; Technical Specification Group Services and System Aspects. Architecture enhancements for service capability exposure. 3GPP TR 23.708 V13.0.0 Jun. 30, 2015.
International Search Report dated Sep. 27, 2017 for corresponding International Application No. PCT/CN2017/089280 filed Jun. 21, 2017.
International Search Report dated Jan. 5, 2018 for corresponding International Application No. PCT/CN2017/104083 filed Sep. 28, 2017.
Huawei Hisilicon, "Session management for scenarios with branching functions", 3GPP S2-164516 SA WG2 Meeting #117-BIS, Sanya, China, Aug. 29-Sep. 2, 2016.
Nokia, Alcatel-Shanghai Bell, Sprint, "New Solution: Session Management to Enable (Re-)selection of Efficient User plane path", 3GPP S2-162507 SA WG2 Meeting #115, Nanjing, P.R. China, May 23-27, 2016.
Huawei, Hisilicon, "Session management support for URLLC in high mobility scenarios", 3GPP S2-163430 SA WG2 Meeting #116, Vienna, Austria, Jul. 11-15, 2016.
Huawei et al., "Solution 4.X: On-demand SM setup", 3GPP TSG SA WG2 Meeting #115 S2-162468, May 23-27, 2016, Nanjing, China, total 2 pages.
3GPP TSG-RAN WG2 Meeting #96 R2-167661, "Status of NG study in SA2", Nokia, CMCC (Rapporteurs), Nov. 14-18, 2016.
3GPP TR 23.799 V2.0.0 (Nov. 2016); 3rd Generation Partnership Project; Technical Specification Group Services and System Aspects; Study on Architecture for Next Generation System (Release 14).
3GPP TSG SA WG2 Meeting # S2-170370, "Application-friendly UP Management", Huawei, HiSilicon, 2016.
"System Architecture for the 5G System; Stage 2;" 3GPP TS 23.501 V0.0.0 (Jan. 2017).
Procedures for the 5G System; Stage 2; 3GPP TS 23.502 V0.0.0 (Jan. 2017).
"Study on Architecture for Next Generation System"; 3GPP TR 23.799 V14.0.0 (Dec. 2016).
China Mobile: "Clarify the Key Issue on Network Capability Exposure", 3GPP DRAFT; S2-161340, Feb. 29, 2016, XP051086307, 3 pages.
3GPP TR 23.799: "Study on Architecture for Next Generation System," Feb. 2016.
3GPP TR 23.799: "Study on Architecture for Next Generation System," Apr. 2016.
3GPP TR 23.799: "Study on Architecture for Next Generation System," May 2016.
3GPP TR 22.891: "Feasibility Study on New Services and Markets Technology Enablers," Mar. 2016.
3GPP TR 23.799 V1.0.1 (Sep. 2016), 3rd Generation Partnership Project; Technical Specification Group Services and System Aspects; Study on Architecture for Next eneration System (Release 14), Sep. 28, 2016. total 423 pages.

* cited by examiner

METHOD AND SYSTEM FOR USER PLANE PATH SELECTION

CROSS-REFERENCE TO RELATED APPLICATIONS

This application claims the benefit of priority to U.S. Provisional Patent Application No. 62/402,412 entitled "Method and System for User Plane Path Selection" filed Sep. 30, 2016 and is a continuation of U.S. patent application Ser. No. 15/712,820, filed on Sep. 22, 2017, the contents of which are hereby incorporated by reference in its entirety.

TECHNICAL FIELD

This disclosure relates to the field of wireless communication networks in general, and to the field of data path or user plane path configuration in particular.

BACKGROUND

Wireless networks can be used for applications which are delay sensitive, and therefore have a tight delay budget. Applications such as smart grid operation and paramedic services are two such examples. For applications with tight delay budgets, the network response time is an important key performance indicator (KPI). One factor which can add to delays is the amount of time it takes for the network to establish user plane paths (also known as data paths) to allow for transmission of data.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Aspects of the disclosure provide a system and method used for allowing a path selection or reselection. In this specification the term "selection" can refer to either an initial selection, or a reselection, of a user plane path. For convenience the term (re)selection is also used to include both a selection and reselection. In some embodiments data packets for a session between a UE and an application system (AS) can utilize a pre-established user plane path between the AS and an access node (AN) which serves the UE. This can allow for faster session set-up times as a new user plane (UP) path need not be established for every new session if existing UP paths can be utilized. Some embodiments allow an application aware (re)selection of the user plane.

An aspect of the disclosure provides a method for path selection. Such a method can include receiving a request for a session; and assigning traffic for the requested session to an established user plane path. In some embodiments assigning includes assigning traffic flowing between a UE and an Application System (AS) from a first user plane path to a second user plane path. In some embodiments the request originates from the AS.

An aspect of the disclosure provides a method for path selection by a control plane function. The method includes receiving a request from an application system for a session, the request including an indication of the location area of a user equipment. The method includes in response, establishing an end-to-end path for the session through a first user plane function selected according to the request. In some embodiments the first user plane function is selected based on the location of potential Access Nodes (ANs) according to the User Equipment's (UE) location area included in the request. In some embodiments the method further includes selecting a second user plane path. In some such embodiments the method can also include assigning traffic flowing between a UE and an Application System (AS) from the first user plane path to a second user plane path. In some embodiments the request is a path selection request. In some embodiments the Application System (AS) includes an Application controller and the request originates from the Application controller. In some embodiments the selecting a second user plane path includes pre-configuring the second user plane path. In some such embodiments the assigning traffic includes receiving a request to handover the session from a first access node to a second access node, and activating the second user plane path. In some embodiments the request to handover the session in carried in a first data packet directed to the second access node. In some embodiments the user plane paths includes a plurality of tunnels. In some embodiments the method further includes configuring traffic steering rules for establishing the user plane tunnels. In some such embodiments the traffic steering rules includes configuring an uplink classifier function in the user plane path. In some such embodiments the session is a packet data unit (PDU) session, the pre-established end-to-end paths are available to carry traffic and establishing an end-to-end path includes selecting at least one of a pre-established path and a pre-established tunnel to carry the PDU session. In some embodiments the request is a tunnel binding request. In some embodiments establishing an end-to-end path includes selecting a UP anchor. In some embodiments packet classification is supported on the path between the UE and the UP anchor. In some embodiments the request is received from an application system via a Service Capability Exposure Function (SCEF). In some embodiments the request includes an indication of at least one of an application location and an application relocation. In some embodiments the request is a request for a packet data unit (PDU) session received from a user equipment and indicates the application to which the PDU session is associated. In some embodiments establishing an end-to-end path includes establishing a tunnel. In some embodiments the request for a session is a request for multiple sessions. In some embodiments the request is triggered by an AS relocation. In some embodiments the request is triggered by an AS reselection.

Another aspect of the disclosure provides a control plane function. Such a control plane function includes a processor and a computer readable storage medium storing path selection programming for execution by the processor, the programming including instructions causing the control plane function to execute a path selection method. Accordingly the programming instruction cause the control plane function to receive a request from an application system for a session, the request including an indication of the location area of a user equipment, and in response, establish an end-to-end path for the session through a first user plane function selected according to the request. In some embodiments the request is a path selection request. In some embodiments the programming including instructions which further cause the control plane function to select a second user plane path; and assign traffic flowing between a UE and an Application System (AS) from the end-to-end path through the first user plane function to the second user plane path. In some embodiments the programming includes instructions which further cause the control plane function to configure traffic steering rules for establishing user plane tunnels. In some embodiments the request is triggered by an AS relocation.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Some applications, such as smart grid operations and paramedic or other emergency services, are delay sensitive. Accordingly, the network response time is an important KPI for such applications. To improve network response time, embodiments establish and configure user plane (UP) paths (also known as data plane paths) before PDU sessions arrive. This pre-establishment reduces delays due to runtime signalling related to path setup during UP path (re)selection procedures. As a result, pre-establishing paths reduces the network response time. Some embodiments provide an enhanced solution to the approaches discussed in 3GPP TR 23.799 v0.8.0 section 6.5.5, in order to enable UP path pre-establishment for applications with tight delay budgets.

Embodiments include providing end-to-end path establishment in the UP (re)selection request procedure. Such a request is processed by a control plane (CP) function which selects a UP path in the core network (CN). In some embodiments the UP path is selected according to a list of UP functions or Application System (AS) locations specified as suitable and/or unsuitable for selection in the request. In some embodiments AS location refers to an AS server or node which hosts an application which participates in a session. In some embodiments the term AS location refers to an access point of the AS, which can be a data network access point that is configured with proper traffic handling rules and can deliver the application traffic to the right application location, and can be an AS server, gateway or other node The CP configures the path in the UP. The request may further include the location area of the UE. According to this information, the CP identifies the Access Nodes (ANs) potentially serving the UE and configures the connection between these ANs and the UP. If the UE has been attached, the CP may alternatively consult with the mobility management function to identify the UE location area and then the potential serving ANs. ANs can include base stations, eNodeBs, access points and the like, including CRAN clusters of remote radio heads connected to a controller.

Figure 1:
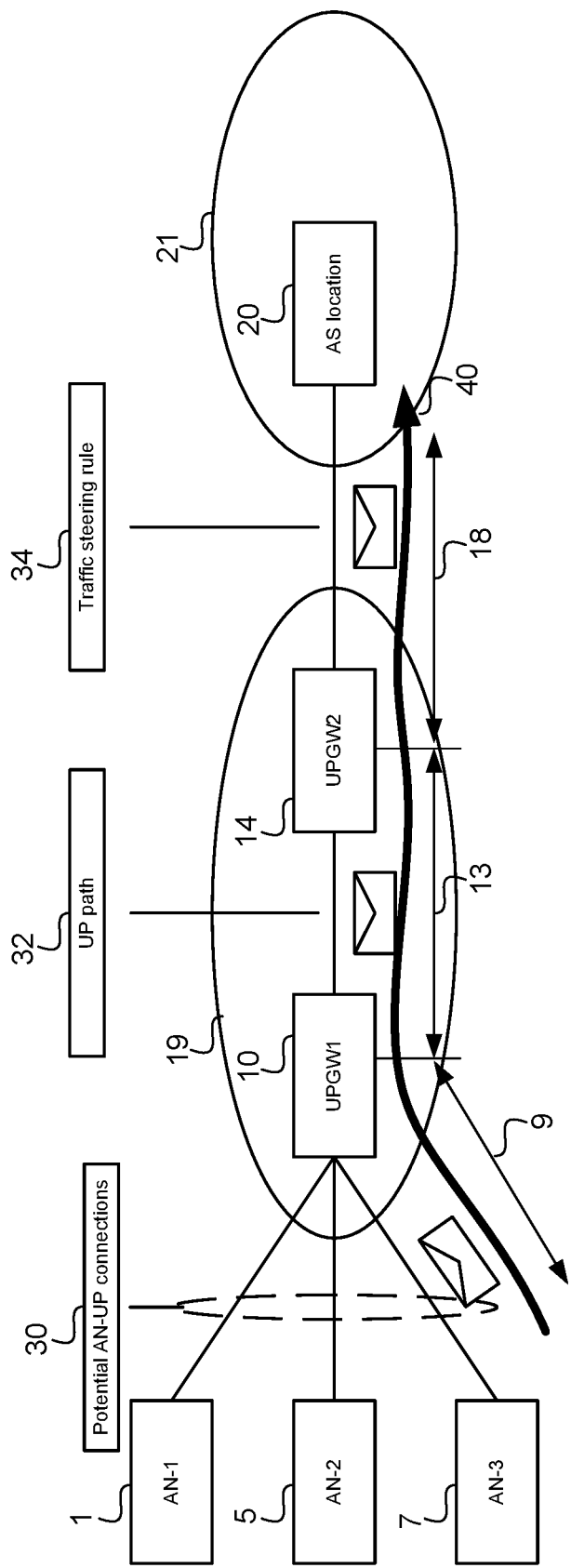
FIG. 1 illustrates an example network with an end-to-end path according to an embodiment.

FIG. 1 illustrates an example network with an end-to-end path according to an embodiment. In this example, the illustrated End-to-End path 40 includes potential AN-UP connections 30, a UP path 32, and a traffic steering rule 34, each schematically illustrated with an envelope to indicate that data can be enclosed in packets transmitted along the UP path. A traffic steering rule is a process for selecting between multiple possible Application System (AS) locations 20 and multiple UP Functions within core network 19. For example, for uplink (UL) traffic, a traffic steering rule determines to which of multiple AS locations a UP function should direct the UL traffic. Further, for downlink (DL) traffic, a traffic steering rule determines to which UP function the AS should direct traffic. Further there may be multiple potential serving ANs AN-1 1, AN-2 5, and AN-3 7. Further there can be multiple AS locations, of which only one is illustrated (AS location 20) within a data network 21. Data network 21 can be the public internet, or a private data network, for example a data network within a hospital or enterprise which includes the AS. Accordingly, there are multiple potential end-to-end paths established for the PDU session. In FIG. 1, there are three potential end-to-end paths for the UP path: (AN-1 1, UPGW1 10, UPGW2 14), (AN-2 5, UPGW1 10, UPGW2 14) and (AN-3 7, UPGW1 10, UPGW2 14). During UP path (re)selection, the AN-UP connection which is activated for the PDU session depends on the actual serving AN of the UE. The activation happens at both the serving AN and the UP, respectively for the UL traffic and the DL traffic of the PDU session. In some embodiments this activation includes creating a mapping or association between the PDU session and the AN-UP connection. In some embodiments, the end-to-end UP path includes a first tunnel (tunnel 9) between the serving AN 7 and UPGW1 10, a second tunnel (tunnel 13) between UPGW1 10 and UPGW2 14 and a third tunnel (tunnel 18) between UPGW2 14 and the AS location 20. To reduce CP-UP signalling and the response time, some embodiments trigger the activation upon transmission of the first UL data packet. For example, in FIG. 1, AN-3 7 is the actual serving AN of the UE; upon receiving the first UL data packet from the UE, AN-3 7 activates its connection with the UP for the PDU session and transmits the first data packet of the PDU session using the connection to the UPGW1 10. On receiving the data packet, the UPGW1 10 activates the AN-UP connection for the DL traffic of the PDU session. UPGW1 10 also sends the data packet along the UP path to the UPGW2 14, which then sends the data packet to the AS location 20. It is noted that these two steps can occur in any order. For some embodiments, in some UP path (re)selection cases such as initial attach and handover, the AN may generate an explicit connection activation request to activate the end-to-end path. This allows for DL traffic destined to the UE to flow before any data packets from the UE are received. In some embodiments, the first UL data packet piggybacks on an explicit connection activation request. In other words, the UE can transmit a first packet along with the request, rather than waiting for the connection to be established before commencing to transmit the UL packets.

Figure 2:
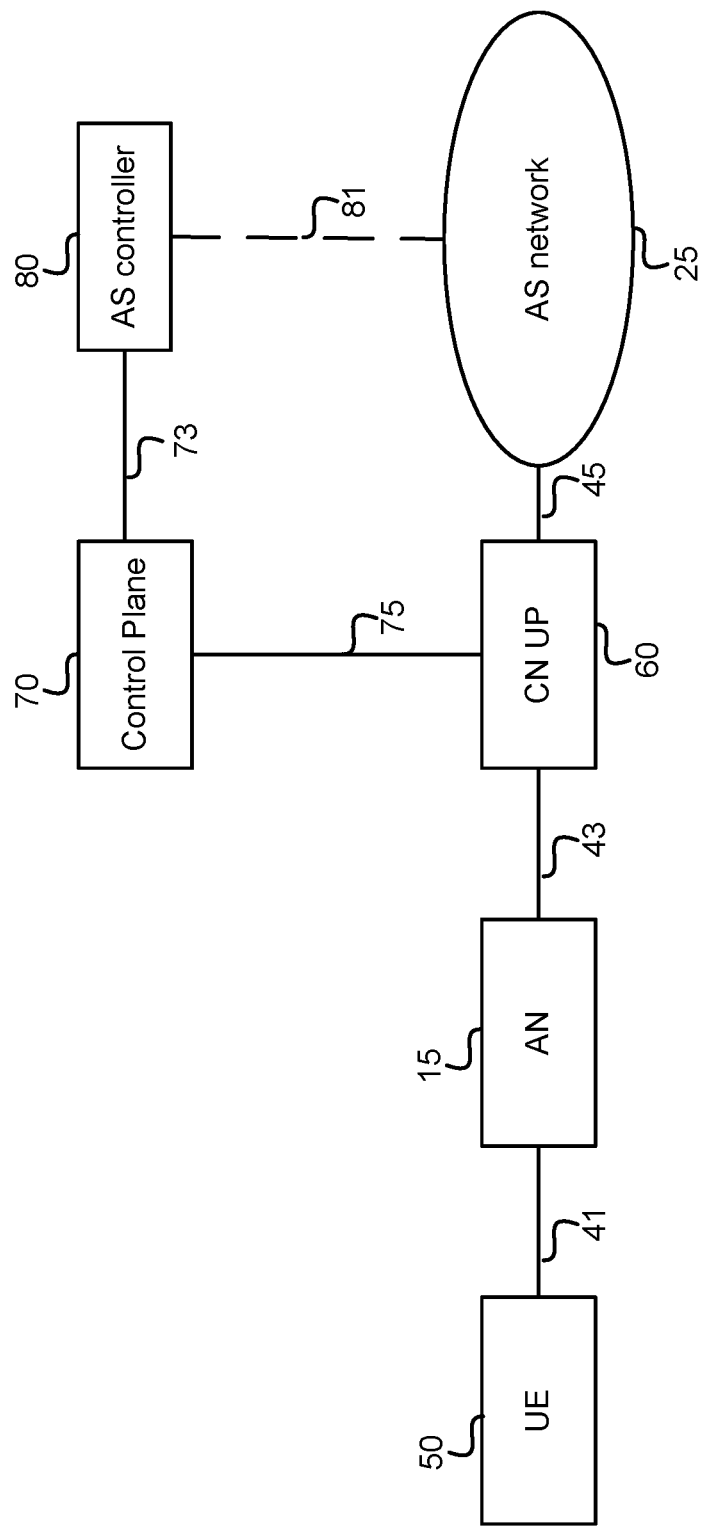
FIG. 2 illustrates an example architecture for a network, according to an embodiment.

FIG. 2 illustrates an example architecture for a network, according to an embodiment. In some embodiments, the architecture components including the UE 50, AN 15, Core Network (CN) UP 60 and Control Plane (CP) 70 can be consistent with 3GPP architectures. FIG. 2 allows for UP connectivity between the UE 50 and an AS network 25. AS network 25 can include one or more application servers. In some embodiments the UP path (re)selection is performed by Control Plane 70 functions and an AS controller 80 (which can be a non-3GPP function) that is in charge of AS (re)selection/(re)location. The interface 81 marked by dashed lines can be a local Data network which connects to, or form part of, the AS network 25. Interface 81 is used by AS controller 80 to communicate with the AS to perform (re)selection/(re)location. Interface 81 can be out of the scope of 3GPP, and in some cases may be out of the control of the operator of the AN and/or the CN. In some embodiments the AS controller can be incorporated within an AS network, for example instantiated within an AS server. In some embodiments the AS controller 80 is a function under the control of the operator and within a trusted domain, and is assumed to have a certain knowledge of the topology of the CN User plane with respect to the AS network 25. Some embodiments provide methods and systems which allow for an application aware (re)selection of user plane path. The actual set of Control Plane 70 functions involved in the procedures discussed herein, or which interface with the AS controller 80, are collectively referred to as "the Control Plane". As should be appreciated by a person skilled in the art, such Control Plane functions can include at least one of Session Management Functions (SMFs), Policy Control Functions (PCFs), Network Exposure Functions (NEFs), Unified Data Repository (UDR), and Unified Data Management (UDM). In FIG. 2 the bold connections 41, 43, and 45 represent UP connections and the connections 73 and 75 are CP connections.

Application-aware UP Path (Re)selection process according to embodiments will now be discussed. Some embodiments are suitable as an update to the existing procedure specified in earlier versions of Solution 6.5.5 as referenced above. Some embodiments include UP (and AN-UP connection) setup as part of the UP (re)selection procedure to support "hop-on". Hop-on is a term that refers to methods and systems which allow for pre-established end-to-end paths which are available to carry traffic for different functions.

Figure 3:
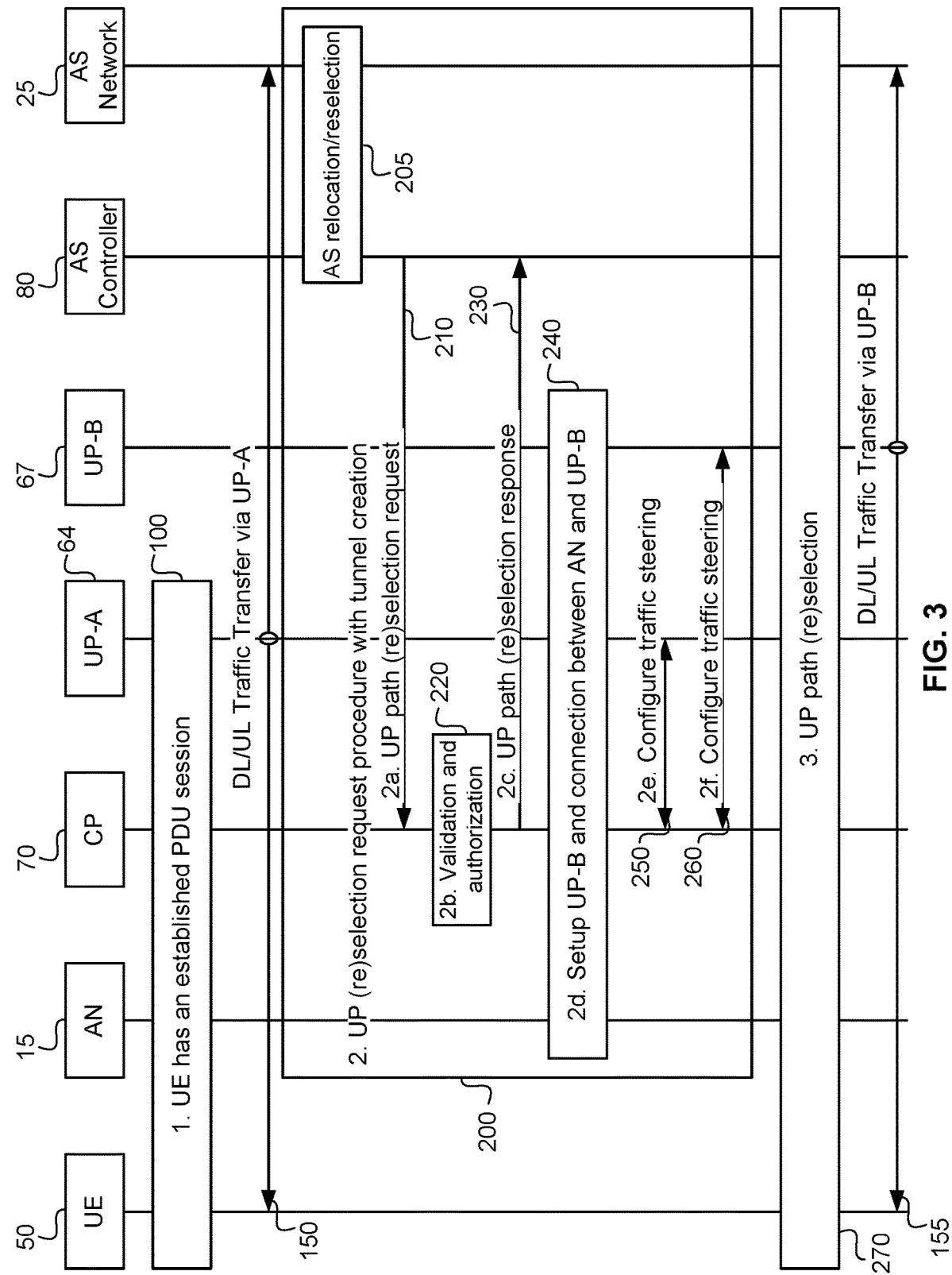
FIG. 3 schematically illustrates message flows as part of a method of UP Path Re)selection, according to an embodiment.

FIG. 3 illustrates a UP (re)selection triggered by an AS Request, according to an embodiment. In some embodiments, this can allow for AS relocation, in the case of the session being handed over to another AS server. Accordingly, an embodiment provides for switching a packet data unit (PDU) session from a first application server to a second application server. This can occur, for example, for AS load balancing purposes, or to allow for maintenance of an AS server, or to update an AS software load, or to follow UE mobility to reduce end-to-end delay. UP-A 64 and UP-B 67 are UP functions, which may be UPGW functions. In FIG. 3 step 1 illustrates the UE has an established PDU session 100 with the application system (AS) via UP-A 64 and DL/UL traffic 150 associated with the session has started to flow. This step is optional, as it won't be performed, for example, in the case of an initial UP path selection. A UE (re)selection request procedure 200 upon a request from AS controller 80 is shown generally at step 2. In some embodiments, this includes tunnel creation. At step 2a a function in the Control Plane receives a UP path (re)selection Request, as illustrated by signal 210, for the PDU sessions associated with the application. This may occur as a result of an AS relocation/reselection step 205. In other words (re)selection Request 210 can be triggered by at least one of an AS relocation and an AS reselection 205. The request 210 may include UE filter information that indicates the PDU sessions to which the requested UP path (re)selection is applied. As stated above, the request may further include the location area of the UE. It is noted that the PDU sessions may be future sessions in the case of an initial UP path selection or ongoing sessions in the case of UP path reselection. For ease of illustration, this procedure describes an example where a single UE 50 is connected to the AS. However, an AS can serve a number of UEs simultaneously, which could result in the UP paths of PDU sessions of multiple UEs being reselected. The request may include a list of UP functions or AS locations suitable and/or unsuitable for selection, to be taken in account during UP path (re)selection. The UP functions and AS locations may be specified using network addresses such as IP address, MAC address, or other type of addresses. The request 210 may include time periods indicating when the requested UP path (re)selection should be applied. In some embodiments the absence of such time periods indicates the requested UP path (re)selection should proceed immediately. The request 210 may include the location change information of the UE 50 indicating where the requested path (re)selection should be applied. These indications of where and when can take the form of, for example, bounding boxes in which the UE is known or expected. In some embodiments the absence of such location area indicates the requested UP path (re)selection should proceed regardless of UE 50's location. The request 210 may include the QoS requirements such as the delay requirement of the PDU session. In some embodiments the request 210 may include a session and service continuity (SSC) indicator for the PDU sessions. The indicator indicates that the CP 70 should configure traffic steering for maintaining the SSC. For embodiments that utilize SSCs, the absence of the indicator implies that the SSC will be handled by the AS network 25. If the SSC indicator is included and the AS controller 80 did not provide an SSC mode for the PDU session, the SSC mode associated with the PDU session is determined according to clause 6.6.1 of the 3GPP TR 23.799 document referred to above. In some embodiments the AS controller 80 communicates with Control Plane 70 directly, whereas in other embodiments the AS controller 80 communicates via an SCEF (Service Capability Exposure Function), also known as a Network Exposure Function (NEF).

In step 2b the Control plane 20 performs a validation and authorization process 220 for the UP path (re)selection request. Other security measures such as authentication can also be carried out at this step. It should be noted that CP 70 in this figure refers generally to the control plane. Each step will be performed by a CP function, but it should be appreciated that different CP functions may perform different steps. At step 2c the Control Plane 70 sends a response back, as illustrated by signal 230, to the AS controller 80, acknowledging the acceptance of the requested UP path (re)selection. In some situations the response can indicate the rejection of the request.

At step 2d, the CP 70 identifies the need for pre-configuring the UP and the connection between the (potential) serving AN(s) and the UP, for example according to the PDU session QoS requirements in the request via set-up process 240. The CP 70 then sets up the UP-B 67 and the AN-UP-B connection as needed. In some embodiments the AN-UP-B connection includes tunnels between the ANs and the UP-B 70. For example, if the UE 50 is not attached at the time of the request, the CP 70 identifies the potential serving ANs according to the UE 50's location area. The UE 50's location area can be provided in the request; otherwise, the CP 70 can estimate the potential serving AN 15 through a UE location tracking mechanism, or by sending a request to a mobility management function. At step 2e the CP 70 generates traffic steering rules according to the UP (re)selection request and configures the rules into UP-A 64, as illustrated by signal 250. This step is optional, as it may not be performed, for example, if this is an initial UP path selection request or if the UP path reselection request does not include an SSC indicator. At step 2f, the CP 70 generates traffic steering rules according to the UP (re)selection request and configures the rules into UP-B 67, as illustrated by signal 260. This step is optional as it may not be performed for example, if the UP path (re)selection request does not include an SSC indicator. This step allows traffic steering rules (e.g for UL traffic) to be configured at UP function before session setup in the case of UP path selection. It is optional if traffic steering is configured dynamically (for example as illustrated in Step 2 (process 400) of described below with reference to FIG. 4.)

At step 3, the Control Plane knows from the step 2(a) which PDU sessions are impacted and which UP functions or AS locations are suitable and/or unsuitable for use. CP 70 initiates process 300 to (re)select the UP for the PDU sessions accordingly. The control plane 70 establishes PDU resources for the UP-B 67. For the case of UP reselection, the CP 70 further updates the PDU session resources to change the PDU session path from UP-A 64 to UP-B 67. The establishment of UP-B 67 and AN-UP-B connection in this step is optional if they have been pre-established at step 2d of the UP (re)selection request procedure.

In some embodiments the (re)selection procedure 270, includes the creation of any tunnels associated with the UP path once step 270 is completed, the AN-UP-B connection has been created allowing DL and UL traffic associated with UP-B 67 to flow between the UE 50 and AS Network 25.

Figure 4:
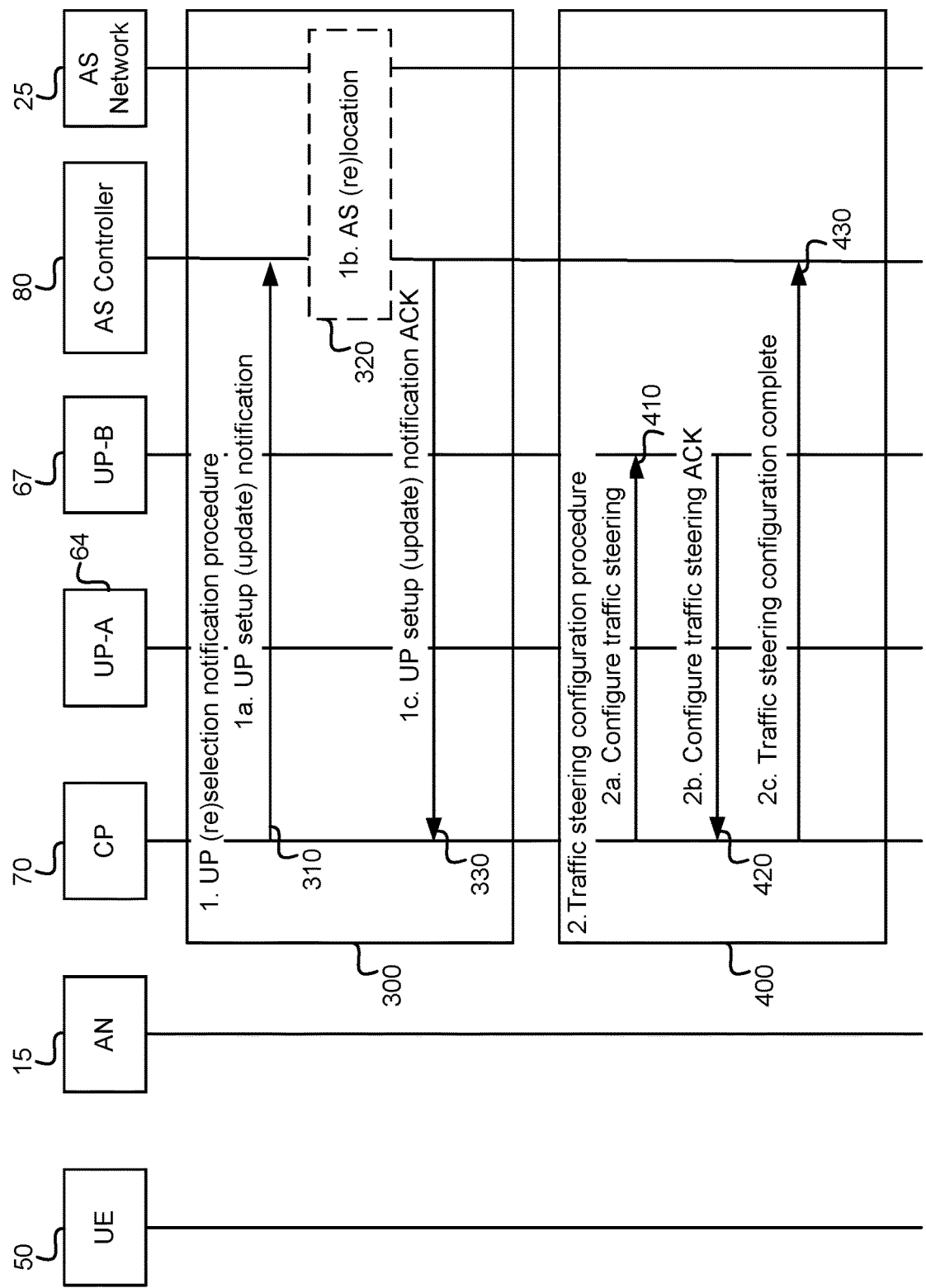
FIG. 4 illustrates a procedure for a UP change notification and traffic steering configuration, according to an embodiment.

FIG. 4 illustrates a procedure for a UP change notification and traffic steering configuration, according to an embodiment. In some embodiments, FIG. 4 shows details of process 270 of FIG. 3, but is not limited to the scenario illustrated in FIG. 3. At step 1, the Control Plane 70 initiates the UP (re)selection notification procedure 300 for a PDU session associated to an AS. This can result from the Control Plane determining the UP gateway during session setup or when the Control Plane determines new UP gateway for the PDU session as a result of UP path reselection. At step 1a, the CP 70 notifies the UP about a setup or change of the PDU session associated to an AS to the AS controller 80 as illustrated by signal 310. At step 1b, the AS controller 80 performs the necessary steps for the AS (re)location or AS state (re)location procedure 320, which may include traffic steering configuration (e.g., for SSC). The details of AS (re)location 320 may vary depending on the requirements of the AS. In some embodiments an AS (re)location 320 include a state (re)location. As an example a (re)location can occur with or without state. For example an application can be instantiated on a plurality of servers within the AS network. This allows for the context associated to the application traffic to be relocated between AS servers. A state relocation can occur when the state of the AS application changes from active to inactive. This change can occur on a per UE or Per UE group basis. In some embodiments, the AS application may be active for one UE group (or UE group) and inactive for another UE (or UE group). For example an instantiated AS application can be made inactive at a source AS server and active at a target AS server, where the source AS server is the current server, and the target AS server will be the new active host of the application. AS (re)location (without "state") can occur when the application itself is relocated between AS servers for the application traffic. This assumes the application is not yet instantiated on the target AS server. Accordingly, when the application is relocated, the "state" typically moves together with it. Furthermore, it is noted that step 320 is shown in dashed lines it may be optional in some cases, as there may be a path (re)selection without necessarily having an AS relocation. At step 1c, the AS controller 80 sends an acknowledgement message, as illustrated by signal 330, to the Control Plane 70 about the acceptance of the notification. The acknowledgement may further include an SSC indicator, implying that the UP should be configured by the CP 70 for maintaining the SSC. In some embodiments the absence of the indicator implies that the SSC has been handled by the AS network 25. At step 2, the CP 70 initiates a traffic steering configuration procedure 400 if an SSC indicator is detected in the step 1c. At step 2a, as illustrated by signal 410, the Control Plane 70 updates the UP to setup the routing of the traffic between the new UP-B 67 and the new AS network 25 serving the UE 50. At step 2b, the CP 70 receives traffic steering configuration acknowledgement signal 420 indicating the successful update of traffic routing. At step 2c, the CP 70 notifies the AS controller 80, as illustrated with signal 430, about the completion of the traffic steering configuration so that they can start to use the new UP-B 67. The notification may trigger the AS controller 80 to finalize AS relocation such as releasing resources and cleaning up data structures. The details of AS controller behavior may vary depending on the requirements of the AS. Note, step 2, process 400, is optional if traffic steering has been pre-configured before UP path (re)selection, in the UP path (re)selection request procedure (e.g., steps 250 and 260 of FIG. 3). It should be noted that for embodiments in which FIG. 4 represents the UP path (re)selection process 270 of FIG. 3, the traffic steering configuration can occur as part of steps 250/260 of FIG. 3, or process 400 of FIG. 4. For example, in some embodiments an application relocation may trigger the traffic steering configuration, as illustrated in step 2a 210 in FIG. 3. For example, when there is an on-going PDU session associated with the application, step 2a 210 triggers the CP 70 to (re)configure traffic steering at the UPF. It is noted that this reconfiguring of the traffic steering rules can occur independent of a UP (re)selection (e.g., whether there is a UP (re)selection or not). It should also be appreciated that UE 50 is connected to AN 15 during the execution of processes 300 and 400.

Figure 5:
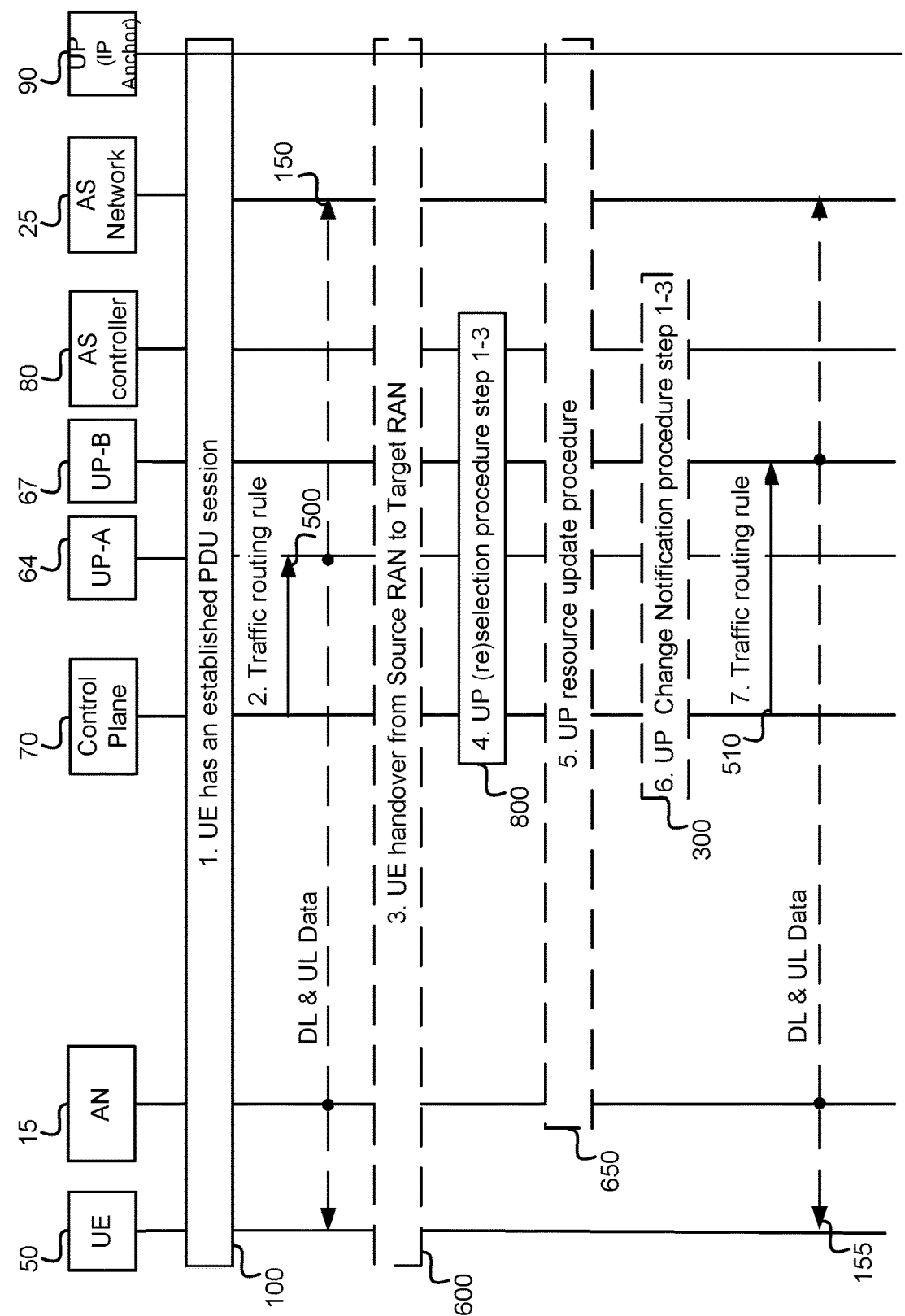
FIG. 5 illustrates a procedure for Application-aware UP Path (Re)selection without an IP anchor UP change, according to an embodiment.

FIG. 5 illustrates a procedure for Application-aware UP Path (Re)selection without an IP anchor UP change, according to an embodiment. In this case, the PDU session is kept with the IP anchor User Plane, while the traffic towards the AS network is offloaded via a local User plane. At step 1, process 100, the UE 50 has an established PDU Session with the IP anchor UP 90. In some embodiments, the traffic steering rules includes configuring an uplink classifier function in the user plane path. Accordingly in some embodiments the UP-A 64 can support an UL classifier (UL-CL) function on the path between the UE 50 and the IP anchor 90. The UL CL function is a UP function that classifies traffic and directs the classified traffic to the proper UP function. At step 2, the Control Plane 70 sends the Traffic routing rule, via signal 500, to the UP-A 64 to offload the traffic to the AS network 25. The traffic routing rule includes the flow description. In some embodiments the traffic routing rule 500 can configure the UL-CL in UP-A 64. It is noted that the terms configuring traffic steering and sending the traffic routing rules are interchangeable. It should be appreciated that DL and UL data associated with UP-A 64 flows between UE 50 and AS Network 25 (illustrated by signal 150). At step 3, process 600, the UE 50 performs handover from source RAN node to target RAN node. If the UP reselection is triggered by the AS controller 80 internally, this step may not happen. At step 4, process 800, the AS controller triggers the UP reselection procedure. It should be appreciated that process 800 performs FIG. 3's steps 2a: UP path (re) selection request 210, 2b: validation and authorization 220, and 2c: UP path (re)selection response 230. The AS controller 80 may make the decision to trigger UP reselection according to the UE 50's location change or AS load balance. At step 5, as illustrated by signal 650, if the UP reselection is triggered by the AS controller 80 internally, e.g. for load balancing, the CP 70 may indicate UP to update related resource. At step 6, process 300, the CP 70 may notify the UP change event to the AS controller 80. It should be appreciated that process 300 performs FIG. 4's steps 1a: UP setup (update) notification 310, 1b: AS (re)location 320, and 1c: UP setup (update) notification ACK 330. At step 7, as illustrated by signal 510, the Control Plane 70 sends the Traffic routing rule to the UP-B 67 to route the traffic to the AS network 25. It should be appreciated that at this point of this process, DL and UL data associated with UP-B 67 flows between UE 50 and AS Network 25 (as illustrated by signal 155). Note, in some embodiments, only traffic towards to the AS network 25 is offloaded by the UP-A 64 and UP-B 67. All other traffic, e.g. UL traffic directed towards the Internet, will still be routed to the IP anchor UP 90. Note, if no local UP is available, CP 70 will reject the UP reselection procedure. It should also be appreciated that UE 50 is connected to AN 15 during this process.

Figure 6:
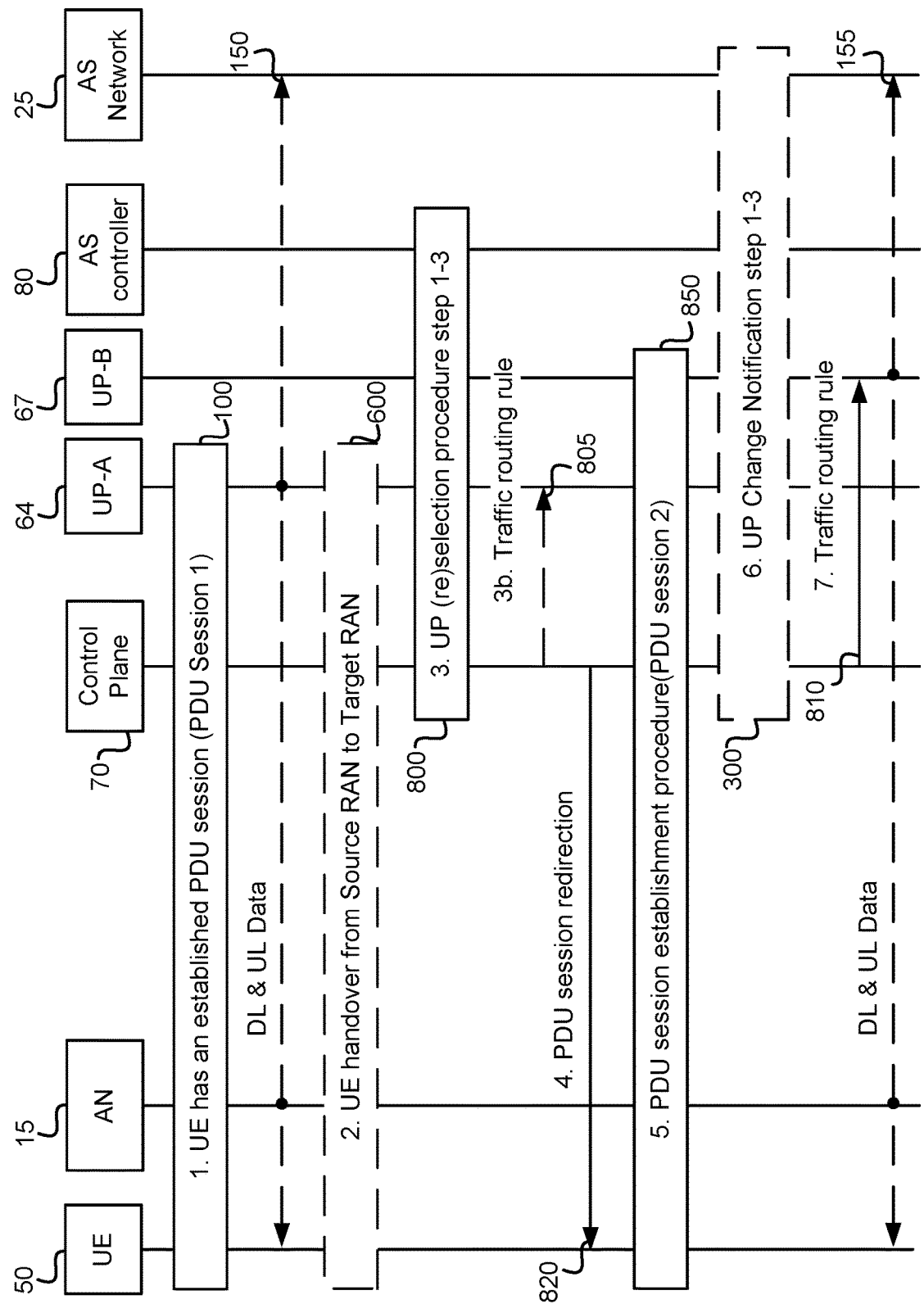
FIG. 6 illustrates a procedure for Application-aware UP Path (Re)selection with an IP anchor UP change, according to an embodiment.

FIG. 6 illustrates a procedure for Application-aware UP Path (Re)selection with an IP anchor UP change according to an embodiment. In this case, the traffic towards to the AS network 25 can be offloaded via IP anchor UP (SSC mode 1, 2, 3, as specified in 3GPP TR 23.799 v0.8.0 sub-clause 6.6.1.1.3). At step 1, process 100, the UE 50 has an established PDU Session 1 with UP-A 64. It should be appreciated that DL and UL data associated with UP-A 64 flows between UE 50 and AS Network 25 (illustrated by signal 150). At step 2, process 600, UE 50 performs handover from source RAN node to target RAN node. If the UP reselection is triggered by the AS controller 80 internally, this step may not happen. At step 3, process 800, the AS controller 80 triggers the UP reselection procedure, for example, as specified in FIG. 3. For example, process 800 performs FIG. 3's steps 2a: UP path (re)selection request 210, 2b: validation and authorization 220, and 2c: UP path (re)selection response 230. The AS controller 80 may make the decision to trigger UP reselection according to a change in UE 50's location or AS load balance. For SSC mode 1, CP 70 rejects the relocation request, however traffic routing may be adjusted to route traffic towards the new AS location in step 3b. For SSC mode 2 and 3, the CP will accept the request. At step 3b, as illustrated by signal 805, the Control Plane 70 sends the Traffic routing rule to the UP-A 64 to route the traffic to the AS network 25. In embodiments in which the request for a path reselection occurs as part of an AS relocation this step configures the UP-A to route traffic to new the AS location indicated in step 800. At step 4, as illustrated by signal 820, the CP 70 function sends a PDU Session Redirection message to UE 50. This message triggers UE 50 to request a new PDU Session for the same data network if the SSC mode 2 & 3 is selected for the UE 50. At step 5, process 850, UE 50 establishes PDU session 2 with UP-B 67. In this step, the traffic routing rule is sent from the CP 70 to the UP. At step 6, process 300, the Control Plane 70 may trigger the UP Change Notification procedure, for example as specified in FIG. 4. For example, process 300 performs FIG. 4's steps 1a: UP setup (update) notification 310, 1b: AS (re)location 320, and 1c: UP setup (update) notification ACK 330. At step 7, as illustrated by signal 810, Control Plane 70 sends the Traffic routing rule to UP-B 67 so that traffic is routed to AS network 25. It should be appreciated that at this point of this process, DL and UL data associated with UP-B 67 flows between UE 50 and AS Network 25 (as illustrated by signal 155). It should also be appreciated that UE 50 is connected to AN 15 during this process.

New procedures which indicate steps to use a pre-configured AN-UP connection for the initial attach and session setup in the case of handover are now discussed according to embodiments.

Figure 7A:
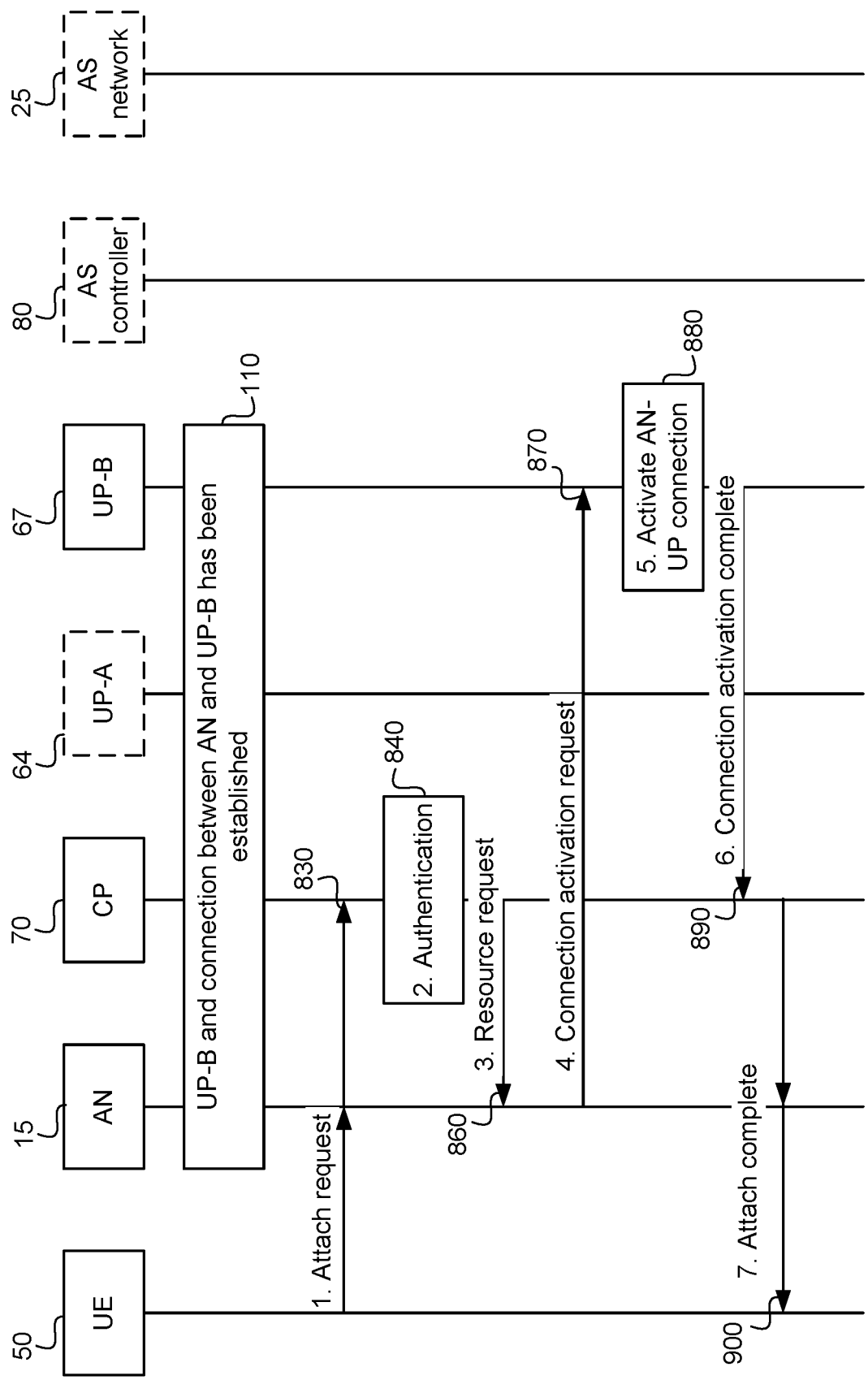
FIG. 7A illustrates an initial attach procedure, according to an embodiment
Figure 7B:
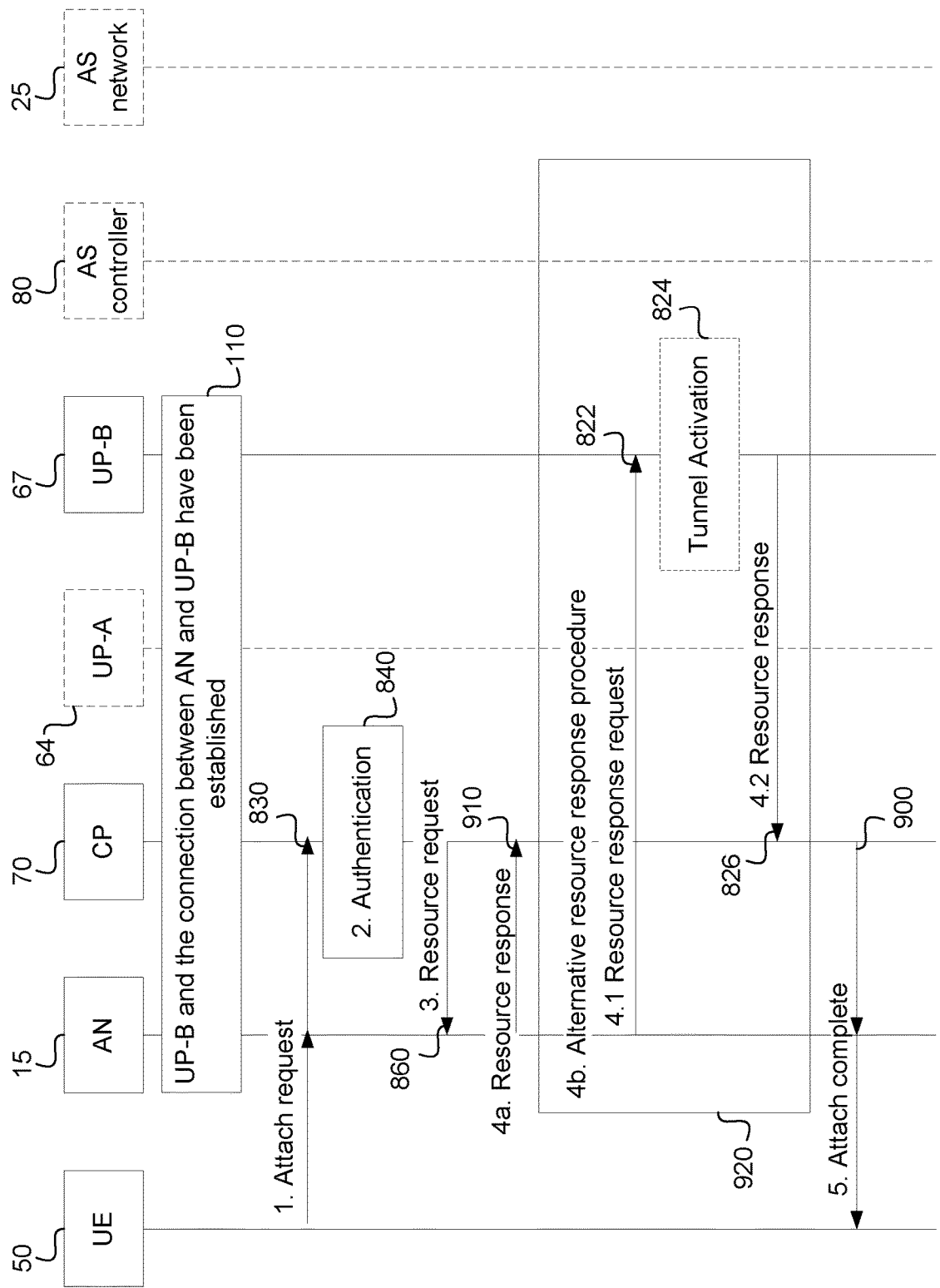
FIG. 7B illustrates an alternative.

FIG. 7A illustrates an example of an initial attach procedure with a preconfigured UP and AN-UP connection, according to an embodiment. In this example UP-B 67 and a connection between the AN 15 and UP-B 67 is already established to allow for UE 50 sessions to "hop-on" and utilize the pre-established UP connections (illustrated by process 110). At step 1, as illustrated by signal 830, UE 50 sends an initial attach request to AN 15 and AN 15 in turn forwards the request to CP 70. At step 2, process 840, CP 70 authenticates UE 50. At step 3, as illustrated by signal 860, CP 70 requests that AN 15 prepare resources. The request indicates the UP function, which as stated above, can be a UPGW. In this example UP-B 67 has been previously established so the request indicates this previous establishment of UP-B 67. At step 4, illustrated by signal 870, AN 15 prepares resources for UE 50 and sends a connection activation request to UP-B 67 through the AN-UP connection. At step 5, process 880, UP-B 67 activates the AN-UP connection for the PDU session upon receiving the activation request. In some embodiments this activation allows for delivery of DL traffic associated with the PDU session. At step 6, illustrated by signal 890, the UPGW sends a connection activation complete message to the CP 70. The message may include an IP address allocated to UE 50. At step 7, as illustrated by signal 900, CP 70 sends an attach complete message to AN 15. This message may include the IP address allocated to the UE 50. AN 15 then forwards this message to UE 50. In some embodiments UP-A 64, AS controller 80, and AS network 25 are illustrated with dashed lines as, in the embodiment illustrated, these nodes are not involved by the actions described in this figure FIG. 7B illustrates an alternative initial attach procedure with a preconfigured UP and AN-UP connection (process 110), according to an embodiment. At step 1, as illustrated by signal 830, UE 50 sends an initial attach request to AN 15 and AN 15 then forwards the request to CP 70. At step 2, process 840, CP 70 authenticates the attach request. At step 3, as illustrated by signal 860, CP 70 requests AN 15 prepare resources. In some embodiments this request also indicates the use of a pre-established UP configuration. At step 4 CP 70 receives a response to the request sent to AN 15. In some embodiments this includes, at step 4a, and as illustrated by signal 910, the CP 70 receives the response from the AN 15. This can occur, for example, if IP allocations are not needed (or are not needed from the UPGW). In other embodiments, IP allocation is performed by the UPGW, as illustrated in the alternative resource response procedure 4b. In which case, at step 4b, process 920, CP 70 receives the response from UP-B 67 GW. This can include sub-steps of 4.1, as illustrated by signal 822, in which AN 15 requests that UP-B 67 provide a response to CP 70. In some embodiments such a request message also requests IP allocation for UE 50. The next step is to optionally activate a tunnel via process 824. This tunnel corresponds to the AN-UP-B connection. The tunnel activation 824 is shown in dashed lines as being optional as not all AN-UP-B connections will require a tunnel, or the tunnel may already be active. At sub-step 4.2, as illustrated by signal 826, UP-B 67 GW sends a resource response to CP 70 on behalf of AN 15. This message includes an IP address allocated to UE 50. At step 5, as illustrated by signal 900, CP 70 sends an attach complete message to AN 15. The message may include the IP address allocated to UE 50 which is forwarded to UE 50 by AN 15. In some embodiments UP-A 64, AS controller 80, and AS network 25 are illustrated with dashed lines as in the embodiment illustrated these nodes are not involved by the actions described in this figure.

Figure 8A:
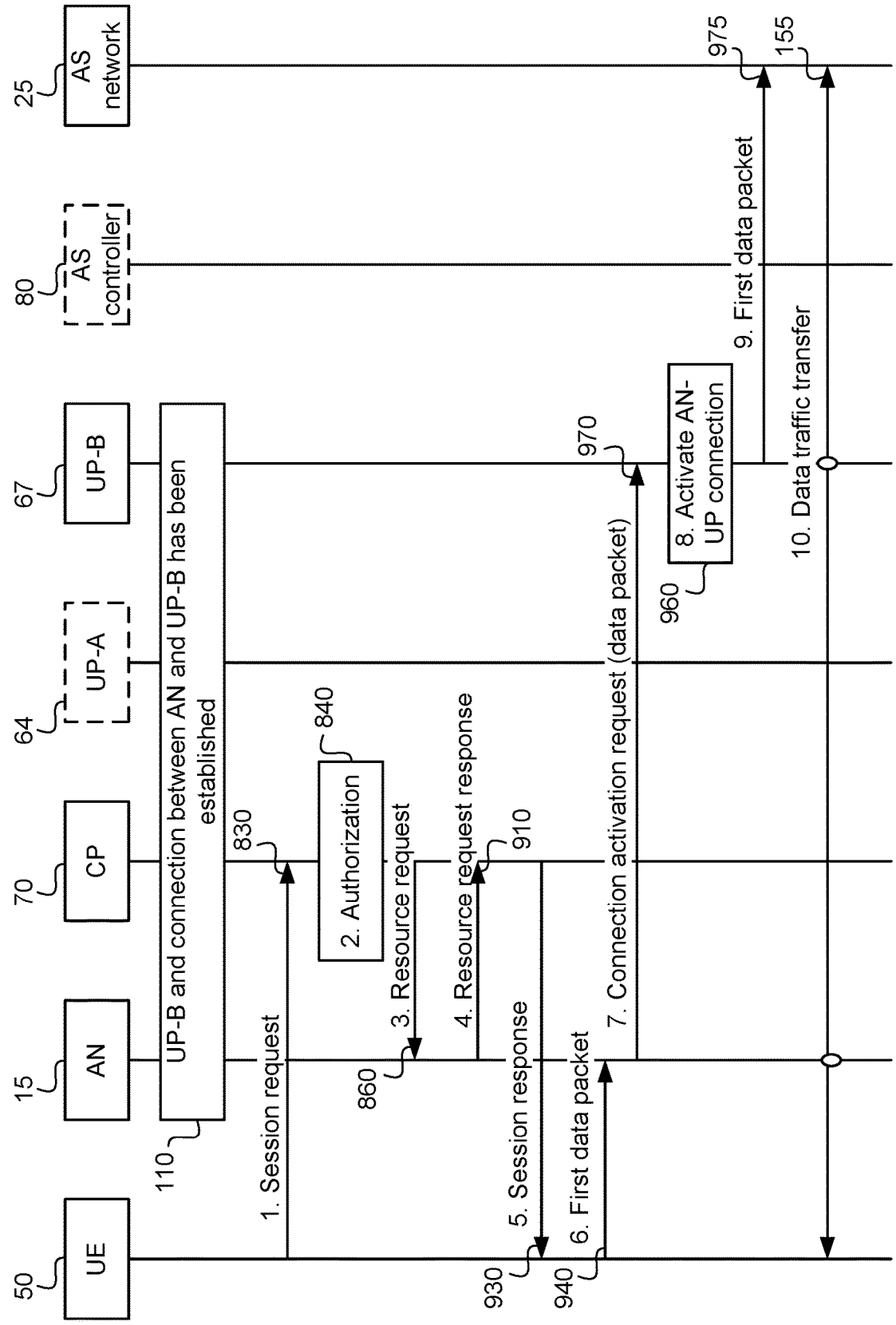
FIG. 8A illustrates a session setup procedure, according to an embodiment
Figure 8B:
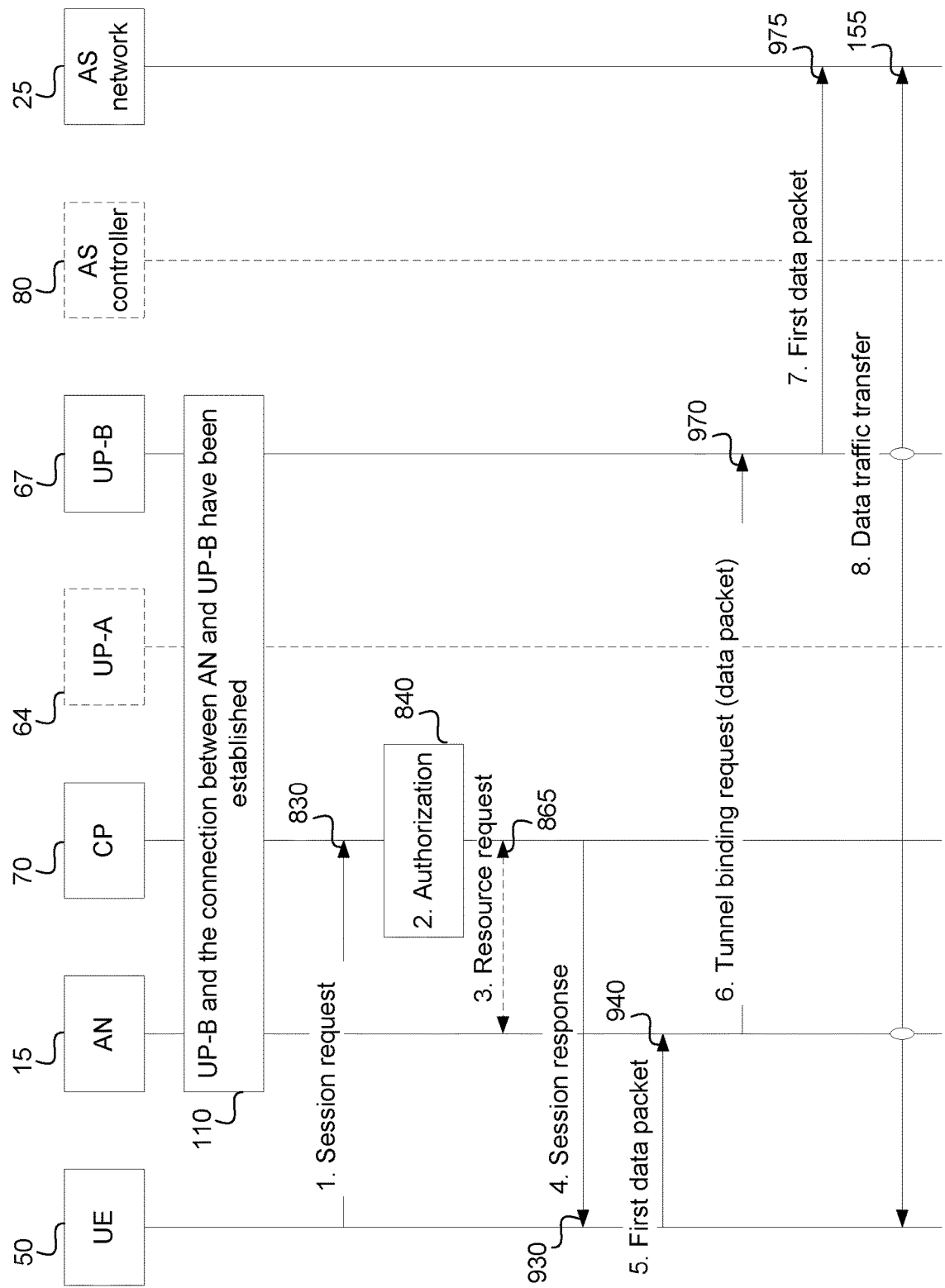
FIG. 8B illustrates an alternative.

FIG. 8A illustrates a session setup procedure with pre-configured UP and AN-UP connection (process 110), according to an embodiment. At step 1, and as illustrated by signal 830, UE 50 sends a PDU session request to CP 70 (or more specifically to a function in the CP). This request indicates the application that the PDU session is associated with. Accordingly, in some embodiments, the request 830 indicates the AS to which the PDU session is associated. For example, the request 830 can identify the AS network 25. It is assumed that the initial attach procedure (describe above with reference to FIG. 3) has been completed. At step 2, process 840, CP 70 verifies the service subscription and authorizes the PDU session. This step is optional, in the sense that it may not be performed if, for example, the request is pre-authorized during the attach procedure. At step 3, as illustrated by signal 860, CP 70 requests that AN 15 prepare resources for the PDU session. At step 4, as illustrated by signal 910, AN 15 prepares resources for the PDU session and sends a resource request response to CP 70. In some embodiments, AN 15 maps (associates or binds) the PDU session to the AN-UP connection. At step 5, as illustrated by signal 930, CP 70 sends a PDU session response to UE 50, indicating that the PDU session has been established. In some embodiments the step includes the IP address allocated to the PDU session. At step 6, as illustrated by signal 940, AN 15 receives the first data packet. At step 7, as illustrated by signal 970, AN 15 sends a connection activation request to UP-B 67. In some embodiments the first data packet piggybacks on the request. At step 8, process 960, UP-B 67 activates the AN-UP connection. The activation allows for delivery of DL traffic associated to the PDU session. At step 9, as illustrated by signal 975, UP-B 67 identifies the data packet piggybacking on the connection activation request and sends it to AS network 25. Step 10 illustrates via signal 155 how Data traffic is transferred through the pre-configured UP and AN-UP connection. In some embodiments UP-A 64, AS controller 80 are illustrated with dashed lines as in the embodiment illustrated these nodes are not involved by the actions described in this figure FIG. 8B illustrates an alternative procedure, according to an embodiment, in which the connection activation request is a tunnel binding request, as illustrated by signal 970. FIG. 8B illustrates, at step 1, and as illustrated by signal 830, UE 50 sends a PDU session request to CP 70 (or more specifically to a function in the CP). It should be appreciated that a connection between AN 15 and UP-B 67 has already been established (process 110). The request indicates the application that is associated with the PDU session. It is assumed that the initial attach procedure (describe above with reference to FIG. 3) has been completed and that a connection exists between AN 15 and UP-B 67 (process 110). At step 2, process 840, CP 70 verifies the service subscription and authorizes the PDU session. This step is optional in the sense that it may not be performed if, for example, the request is pre-authorized during the attach procedure. At step 3, as illustrated by signal 865, CP 70 requests AN 15 prepare resources for the PDU session. AN 15 sends a resource request response to the CP 70 when the resources are available. In some embodiments, AN 15 maps (associates or binds) the PDU session to the AN-UP UL connection. In some embodiments, this includes the AN binding the PDU session to the correct AN-UP tunnel used for the UL. At step 4, as illustrated by signal 930, CP 70 sends a PDU session response to UE 50 indicating the establishment of the PDU session. At step 5, as illustrated by signal 940, the AN 15 receives the first data packet. At step 6, AN 15 maps (associates or binds) the PDU session to the AN-UP connection by sending a Tunnel binding request 970 to UP-B 67. Binding request 970 allows the UPGW (e.g., UP-B 67) to bind the PDU session to the correct tunnel in the DL. In some embodiments the first data packet piggybacks on this request. At step 7, as illustrated by signal 975, UP-B 67 identifies the data packet piggybacking on the connection activation request and sends it to AS network 25. Step 8 illustrates, via signal 155, how Data traffic is transferred through the pre-configured UP and AN-UP connection. It should be appreciated that in the embodiment illustrated neither UP-A 64 nor AS controller 80 are involved in the actions described in FIG. 8B.

Figure 9A:
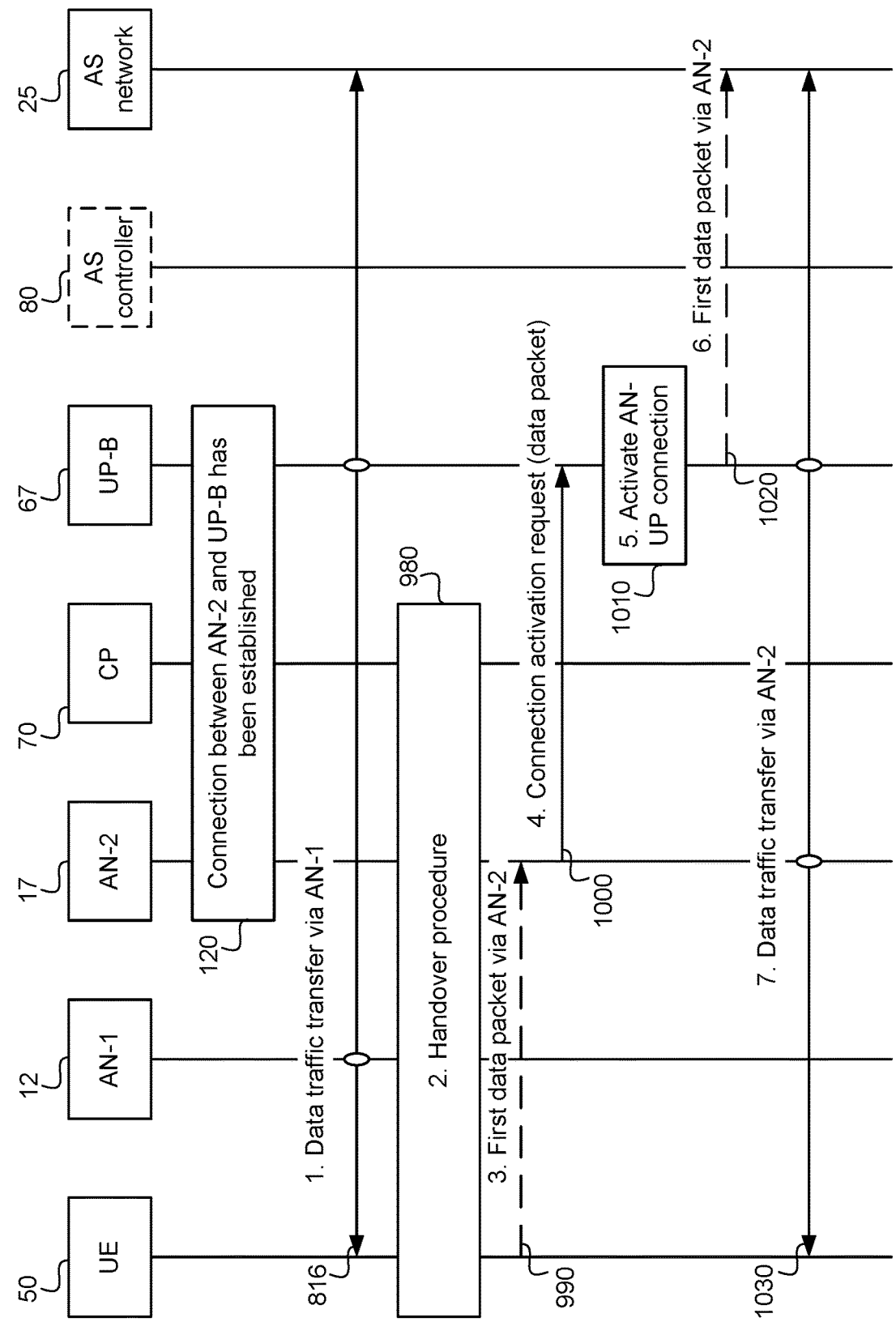
FIG. 9A illustrates a handover procedure, according to an embodiment

FIG. 9A illustrates a handover procedure with pre-configured AN-UP connection between AN-2 17 and UP-B 67, according to an embodiment. At step 1, as illustrated by signal 816, Data traffic is transferred via AN-1 12. At step 2, process 980, the PDU session is handed over to AN-2 17. This can include AN-1 12 being configured to forward any leftover data packets of the PDU session to AN-2 17, and AN-2 17 maps (associates) the PDU session to the pre-configured AN-UP connection between AN-2 17 and UP-B 67. At step 3, as illustrated by signal 990, AN-2 17 receives the first data packet associated with the PDU session. Step 3 is optional. At step 4, as illustrated by signal 1000, AN-2 17 sends a connection activation request to UP-B 67 through the pre-configured AN-UP connection. The first data packet received at AN-2 17 (if any) piggybacks on the request. However, if no first packet is received from UE 50, then it is noted that this step still occurs after the handover procedure. In some embodiments a dummy packet is sent. At step 5, process 1010, the UP activates the AN-UP connection. The activation allows for delivery of DL traffic associated with the PDU session. At step 6, as illustrated by signal 1020, UP-B 67 identifies the data packet piggybacking on the connection activation request and sends it to AS network 25. At step 7, signal 1030, Data traffic is transferred via AN-2 17. It should be appreciated in the embodiment illustrated, AS controller 80 is shown in dashed lines as it is not involved in the actions of FIG. 9A.

Figure 9B:
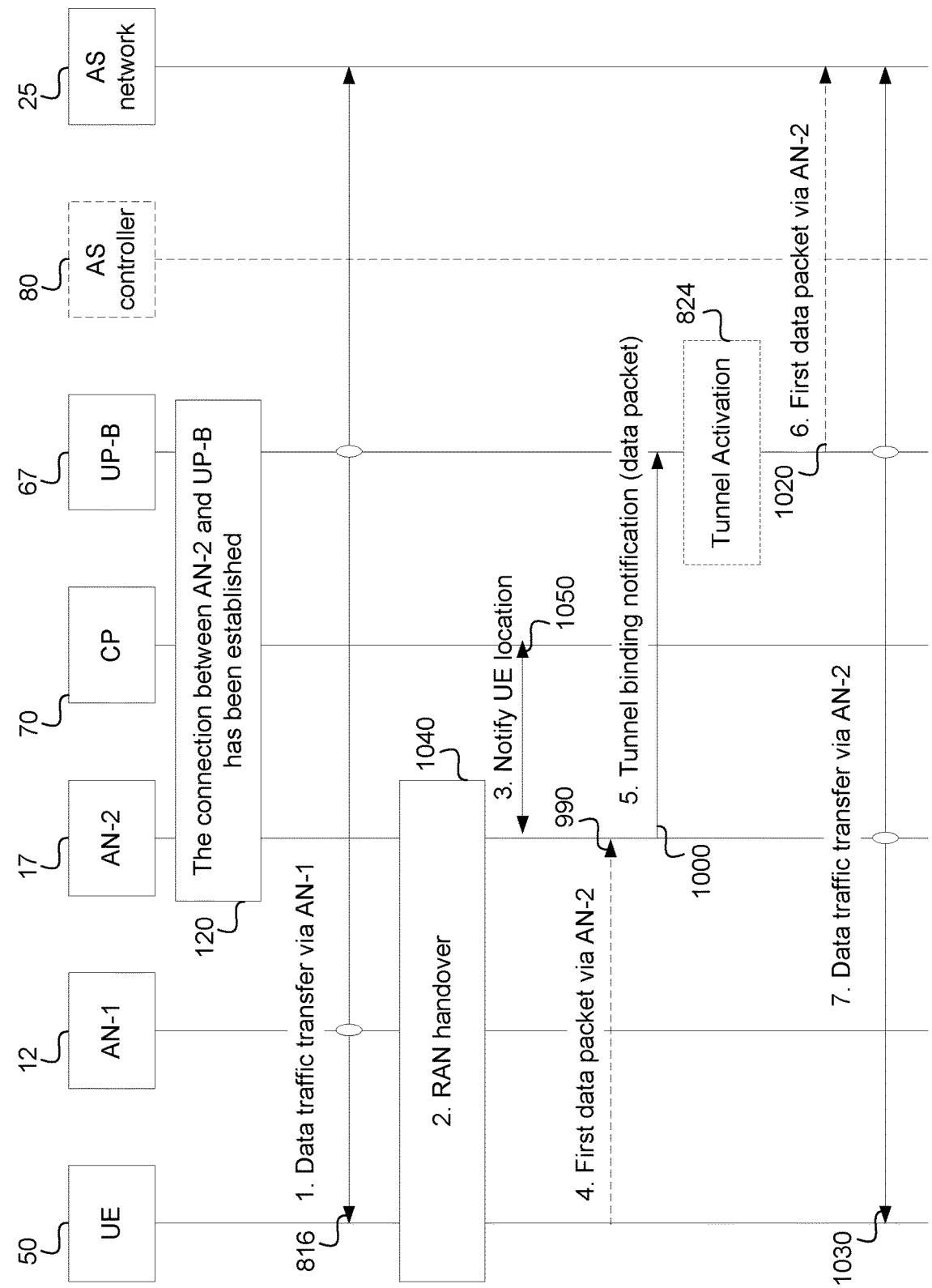
FIG. 9B illustrates an alternative.

FIG. 9B illustrates an alternative handover procedure with pre-configured AN-UP connection between AN-2 17 and UP-B 67, according to an embodiment. It should be appreciated that a connection between AN-2 17 and CP-B 67 has already been established (process 120). At step 1, as illustrated by signal 816, data traffic is transferred via the AN-1. At step 2, process 1040, the PDU session is handed over to the AN-2 17 and AN-1 12 is configured to forward any leftover data packets of the PDU session to AN-2 17. AN-2 17 also binds the PDU session to the pre-configured AN-UP-B connection. At step 3, as illustrated by signal 1050, AN-2 17 notifies CP 70 about UE 50's location (which can be used for location tracking purposes). At step 4, as illustrated by signal 990, AN-2 receives the first data packet associated to the PDU session. Step 4 is optional. At step 5, as illustrated by signal 1000, AN-2 17 sends a tunnel binding request to UP-B 67 GW. The first data packet routed through AN-2 17 (if any) piggybacks on the request. It should be appreciated that "Tunnel binding notification (data packet)" is an alternative description for the "connection activation request" (signal 1000 in FIG. 9A). The next step is to optionally activate a tunnel via process 824. In this example the tunnel may correspond to the connection between AN-2 and UP-B At step 6, as illustrated by signal 1020, the UP-B 67 GW binds the PDU session to the preconfigured the AN-UP-B connection. The binding allows for delivery of DL traffic associated to the PDU session. The UP-B 67 GW identifies the data packet piggybacking on the tunnel binding request and sends it to AS network 25. At step 7, as illustrated by signal 1030, data traffic is transferred via AN-2 17. It should be appreciated that in the embodiment illustrated AS controller 80 is shown in dashed lined as it is not involved in the actions of FIG. 9B.

Embodiments provide for methods and systems for supporting customer service delivery over a network. Embodiments provide a method and apparatus for implementing, in a 5G wireless communication network, data transmission procedures for use with node-level tunnel protocols. This method and system employs network slices to provide UEs connecting to the network with access to the customer services. The network slice concept has been accepted in wireless telecommunication industry. As used herein, a "slice" is a set of network resources (cloud resources, physical connection resources, wireless spectrum resources, telecommunication equipment resources (access cells), UP paths, tunnels), which has been allocated to a service or a set of services. The created slice can also be referred to as a virtual network (VN) and the terms are used interchangeably herein.

In some embodiments this system and method facilitates slice-aware service traffic delivery, or "Hop-On" traffic delivery. In particular, this traffic delivery system and method can be compared to a traveler that hops-on a tourist bus having a pre-defined sightseeing route. The traveler can choose to join or leave the tourist bus without any additional set-up or coordination after the initial access to the bus. In the present traffic delivery system and method, a pre-established UP path can be considered a VN or in some cases a slice, which can be used to deliver traffic for services or sessions. In some cases access to a service may not require per-UE per-session establishment, and may not require end-to-end connection setup between the UE and the service provider. In some cases there is no session setup as the session is effectively "pre-existing" as a VN slice established on the network. The VN slice supported by a pre-defined VN topology configured on the network. The UE only needs to negotiate its entry or exit from the slice which may occur at a localized level. The connection between the slice access point and the service provider is established and maintained by the control functions managing the slice.

Such a hop-on scheme facilitates management of service delivery on a per-service basis over a VN tunnel. For example, a preconfigured tunnel can be used on per PDU session basis. Alternatively, a preconfigured tunnel can be used on a per service basis, allowing a per service tunnel to be shared by multiple PDU sessions. Physical network nodes can treat traffic of one service the same and there is may not be a requirement to differentiate between UEs, except in the access link. Accordingly per-UE/per-session setup related overhead (remote configuration) and latency can be removed or reduced and there is no (or reduced) per UE "session connection context" required in the network.

After a UE registers to the network and UP slice(s), the only required UE-specific context required is the UE's location (i.e., a current anchor point of this UE—at a VN node), activity status and registered UP slice(s) which allow Hop-On and access to customer services as and when required.

Figure 10:
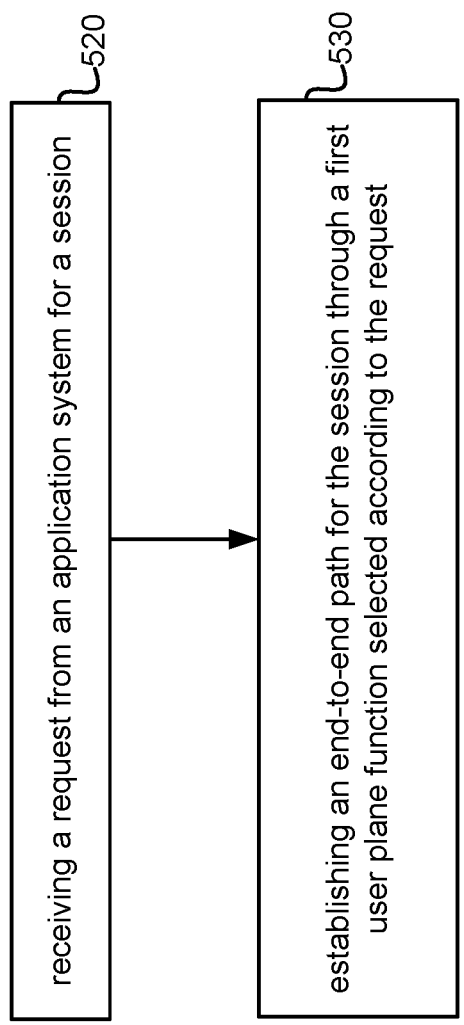
FIG. 10 illustrates a method for path selection by a control plane function, according to an embodiment.

FIG. 10 illustrates a method for path selection by a control plane function, according to an embodiment. The method includes receiving a request from an application system for a session 520, the request including an indication of the location area of a user equipment. The method includes in response, establishing an end-to-end path 530 for the session through a first user plane function selected according to the request. It should be appreciated that the end-to-end path can include additional user plane functions, including an anchor function. Such a method can be executed by a processing system including a processor and a computer readable storage medium storing path selection programming for execution by the processor, the programming including instructions causing the control plane function to carry out the method steps described herein.

Another aspect of the disclosure provides a method performed by an application system. Such a method includes transmitting a path selection request to a network control plane function, receiving a response from the network control plane function, and switching a packet data unit (PDU) session from a first application server to a second application server. In some embodiments the request includes the location area for a user equipment associated with the PDU. Such a method can be executed by a processing system including a processor and a computer readable storage medium storing programming for execution by the processor, the programming including instructions causing the application system to carry out the method steps described herein.

Figure 11:
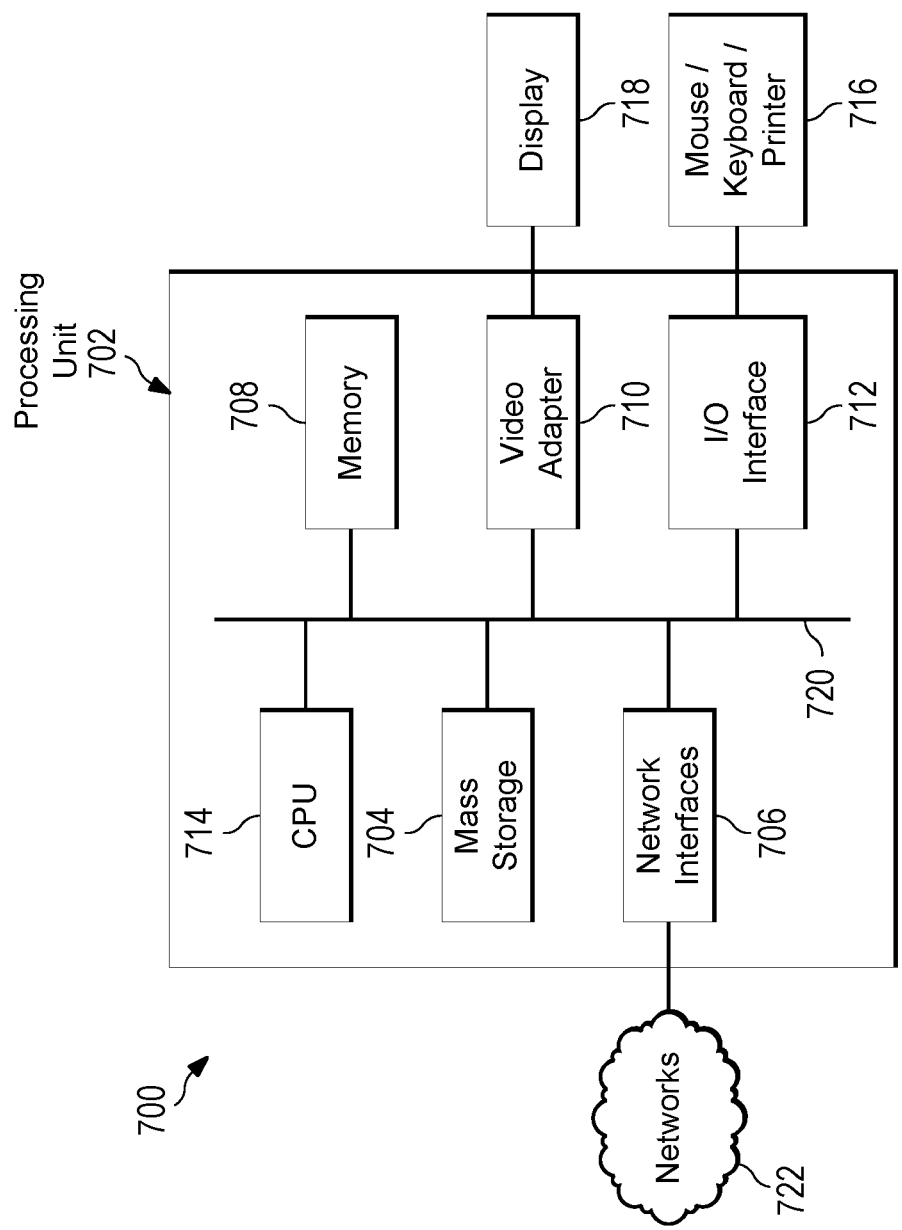
FIG. 11 is an exemplary block diagram of a processing system that may be used for implementing the various network functions, according to an embodiment.

FIG. 11 is an exemplary block diagram of a processing system 700 that may be used for implementing the various network functions, according to an embodiment. As shown in FIG. 10, processing system 700 include processing unit 702 which includes a processor (e.g., CPU) 714, mass storage 704 memory 708, network interface 706, networks 722, I/O interface 712, which in some cases where the processing unit directly receives or provides input to a user, mouse/keyboard/printer 716, video adapter 710 and display 718, all of which are communicatively coupled via bi-directional bus 720.

According to certain embodiments, all of the depicted elements may be utilized, or only a subset of the elements. Further, the processing unit 702 may contain multiple instances of certain elements, such as multiple processors, memories, or transceivers. Also, elements of processing system 702 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing unit 702 can be used to implement a UE or host which executes the various network control plane functions or the AS controller or an AS server as described herein.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A method comprising:
   receiving, by a network element in a control plane (CP) of a communication network from an application server (AS) controller, a request related to a user equipment (UE), wherein the request comprises a list of AS locations;
   when a current UE location of the UE is at a location area, triggering, according to the request, by the network element in the CP of the communication network, a user plane (UP) path reselection for the UE based on the list of AS locations so that a new path is established for the UE:
   wherein during the UP path reselection:
   a path for the UE based on the list of AS locations is selected, wherein the path goes through an AS location selected from the list of AS locations and a network element in a UP of the communication network; and
   the network element in the UP is configured to direct a traffic of the UE to the selected AS location,
   wherein the request further comprises the location area indicating where to apply the user plane (UP) path reselection based on the list of AS locations to establish the new path for the UE, and
   wherein the request further comprises a time period indicating when to apply the UP path reselection.

2. The method of claim 1 wherein the network element in the UP is selected according to the request, and the current UE location.

3. The method of claim 1 wherein the network element in the UP is configured according to a traffic steering rule used to establish a user plane tunnel associated with the traffic of the UE.

4. The method of claim 3 further comprising configuring the traffic steering rule by configuring an uplink classifier function in the UP path.

5. The method of claim 1 wherein during the UP path reselection:
   a pre-established path and a pre-established tunnel between an access node (AN) and the network element in the UP for the traffic of the UE is selected; and
   an activation request is sent by the AN to the network element in the UP in the selected pre-established path through the pre-established tunnel upon a receipt of one or more of:
   a data packet from the UE; or
   a request from the network element in the CP of the communication network.

6. The method of claim 1 wherein the received request is associated with a future PDU session of the UE.

7. The method of claim 1 wherein the received request is associated with a plurality of UEs.

8. The method of claim 1 wherein the request further includes an indicator indicating that the network element in the CP of the communication network should configure traffic steering for maintaining session and service continuity (SSC) for a PDU session associated with the traffic of the UE, and the network element in the CP of the communication network configures the network element in the UP to maintain SSC according to the indicator.

9. The method of claim 1 further comprising:
   sending, by the network element in the CP of the communication network to the AS controller, a notification about a UP event;
   receiving, from the AS controller by the network element in the CP of the communication network, an acknowledgement to the notification, wherein the acknowledgement includes an indicator indicating that the network element in the CP of the communication network should configure traffic steering for maintaining session and service continuity (SSC) for a PDU session associated with the traffic of the UE; and
   configuring, by the network element in the CP of the communication network, the network element in the UP to maintain SSC according to the indicator.

10. The method of claim 1, wherein before one of following procedures: a UE attachment procedure, a PDU session setup procedure, or a UE handover procedure, the method further comprises:
    identifying a need of pre-establishing the new path according to QoS requirements of a PDU session associated with the UE wherein the QoS requirements are included in the request; and pre-establishing the new path for the UE, wherein the new path goes through a potential serving access node of the UE that is identified according to the location area indicated in the request.

11. The method of claim 5, wherein the network element in the CP of the communication network selects the pre-established path and the pre-established tunnel during one of following procedures:
   a UE attachment procedure,
   a PDU session setup procedure, or
   a UE handover procedure.

12. The method of claim 5 further comprising receiving an internet protocol (IP) address allocated to the UE, the IP address received from a second network element in the UP of the communication network.

13. The method of claim 12 wherein the receiving an IP address comprises:
   receiving the IP address from the second network element in the UP of the communication network, and then sending the IP address to the AN, by one of:
   the network element in the CP of the communication network, or
   the network element in the UP of the communication network.

14. The method of claim 13, wherein the network element in the UP is the second network element in the UP.

15. The method of claim 1, wherein the AS location is selected by the network element in the CP.

16. An apparatus comprising:
   a processor; and
   a memory having stored thereon machine readable instructions, which when executed by the processor configure the apparatus for:
   receiving, from an application server (AS) controller, a request related to a user equipment (UE), wherein the request comprises a list of AS locations;
   when a current UE location of the UE is at a location area, triggering, according to the request, a user plane (UP) path reselection for the UE based on the list of AS locations so that a new path is established for the UE;
   wherein during the UP path reselection:
   a path for the UE based on the list of AS locations is selected, wherein the path goes through an AS location selected from the list of AS locations and a network element in a UP of a communication network; and
   the network element in the UP is configured to direct a traffic of the UE to the selected AS location,
   wherein the request further comprises the location area indicating where to apply the user plane (UP) path reselection based on the list of AS locations to establish the new path for the UE, and
   wherein the request further comprises a time period indicating when to apply the UP path reselection.

17. A non-transitory computer-readable medium comprising instructions which, when executed by an electronic device, cause the electronic device to perform a method comprising:
   receiving, from an application server (AS) controller, a request related to a user equipment (UE), wherein the request comprises a list of AS locations;
   when a current UE location of the UE is at a location area, triggering, according to the request, a user plane (UP) path reselection for the UE based on the list of AS locations so that a new path is established for the UE;
   wherein during the UP path reselection:
   a path for the UE based on the list of AS locations is selected, wherein the path goes through an AS location selected from the list of AS locations and a network element in a UP of a communication network; and
   the network element in the UP is configured to direct a traffic of the UE to the selected AS location,
   wherein the request further comprises the location area indicating where to apply the user plane (UP) path reselection based on the list of AS locations to establish the new path for the UE, and
   wherein the request further comprises a time period indicating when to apply the UP path reselection.

* * * * *